(12) United States Patent
Kim et al.

(10) Patent No.: US 12,558,198 B2
(45) Date of Patent: Feb. 24, 2026

(54) METHOD AND APPARATUS FOR DETERMINING AMOUNT OF BONE GRAFT, COMPUTER-READABLE RECORDING MEDIA, AND COMPUTER PROGRAM

(71) Applicant: OSSTEM IMPLANT CO., LTD., Seoul (KR)

(72) Inventors: Jongmoon Kim, Gunpo-si (KR); Sanghyeong Cho, Seoul (KR); Kyoo Ok Choi, Seoul (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 250 days.

(21) Appl. No.: 18/562,110

(22) PCT Filed: Jul. 26, 2022

(86) PCT No.: PCT/KR2022/010951
§ 371 (c)(1),
(2) Date: Nov. 17, 2023

(87) PCT Pub. No.: WO2023/008872
PCT Pub. Date: Feb. 2, 2023

(65) Prior Publication Data
US 2024/0238071 A1    Jul. 18, 2024

(30) Foreign Application Priority Data
Jul. 28, 2021    (KR) ........................ 10-2021-0099261

(51) Int. Cl.
*G06T 7/00*        (2017.01)
*A61C 8/00*        (2006.01)
(Continued)

(52) U.S. Cl.
CPC ............ *A61C 8/009* (2013.01); *G06T 7/0012* (2013.01); *G06T 7/13* (2017.01); *G06T 7/55* (2017.01);
(Continued)

(58) Field of Classification Search
CPC ....... A61C 8/009; A61C 19/04; A61C 8/0006; G06T 7/0012; G06T 7/13; G06T 7/55;
(Continued)

(56) References Cited

U.S. PATENT DOCUMENTS 8,389,714 B2    3/2013    Bury
9,259,320 B2    2/2016    Boiangiu
(Continued)

FOREIGN PATENT DOCUMENTS

JP        5792620 B2    10/2015
JP        5868845 B2    2/2016
(Continued)

OTHER PUBLICATIONS

Dentsply Sirona Implants "Simplant 18, Instructions for Use" Instructions Manual (2017) pp. 1-108.
(Continued)

*Primary Examiner* — Van D Huynh
(74) *Attorney, Agent, or Firm* — NSIP Law

(57)        ABSTRACT

Embodiments may provide a method for measuring a site of bone graft and an amount of bone graft around a virtual fixture. To this end, according to embodiments, a type of bone defect may be determined based on bone density information of an alveolar bone around a virtual fixture, and the site of bone graft and the amount of bone graft may be determined according to the determined type of bone defect. According to embodiments, there is an advantageous effect that accurate information can be provided to a user to enable precise grafting during implant surgery.

14 Claims, 35 Drawing Sheets

(51) Int. Cl.

| | | |
|---|---|---|
| *G06T 7/13* | (2017.01) | |
| *G06T 7/55* | (2017.01) | |
| *G06T 7/62* | (2017.01) | |

(52) U.S. Cl.
CPC ...... *G06T 7/62* (2017.01); *G06T 2207/20081* (2013.01); *G06T 2207/20084* (2013.01); *G06T 2207/30008* (2013.01); *G06T 2207/30036* (2013.01)

(58) Field of Classification Search
CPC ............ G06T 7/62; G06T 2207/20081; G06T 2207/20084; G06T 2207/30008; G06T 2207/30036; A61B 6/51; A61B 2034/102; A61B 2034/105; A61B 2034/108; A61B 34/10; A61B 6/505; A61B 6/5217; A61B 6/5229; A61F 2002/2835; A61F 2/2803; G16H 30/20; G16H 30/40; G16H 50/20
See application file for complete search history.

(56) References Cited

U.S. PATENT DOCUMENTS

| | | | |
|---|---|---|---|
| 9,861,482 B2 | 1/2018 | Boiangiu | |
| 10,945,794 B2 | 3/2021 | Tjon | |
| 2011/0141400 A1 | 6/2011 | Heo | |
| 2011/0151400 A1* | 6/2011 | Boiangiu | A61F 2/02 |
| | | | 433/76 |
| 2012/0214121 A1* | 8/2012 | Greenberg | A61B 6/5247 |
| | | | 433/213 |
| 2013/0089827 A1 | 4/2013 | Tsuji et al. | |
| 2013/0090742 A1 | 4/2013 | Boiangiu | |
| 2013/0101951 A1* | 4/2013 | Tsuji | A61P 43/00 |
| | | | 433/1 |
| 2013/0196280 A1* | 8/2013 | Kim | G16H 50/30 |
| | | | 433/24 |
| 2016/0157965 A1 | 6/2016 | Boiangiu | |

| | | | |
|---|---|---|---|
| 2018/0132976 A1* | 5/2018 | Hwang | G16H 50/30 |
| 2019/0038384 A1* | 2/2019 | Lizarazo Rozo | A61B 6/032 |
| 2020/0046473 A1* | 2/2020 | Kim | A61B 34/10 |
| 2022/0296343 A1* | 9/2022 | Lagardere | A61C 13/34 |
| 2022/0370204 A1* | 11/2022 | Hartman | A61L 27/58 |
| 2024/0046490 A1* | 2/2024 | Lang | A61B 90/361 |

FOREIGN PATENT DOCUMENTS

| | | |
|---|---|---|
| KR | 10-1626347 B1 | 5/2016 |
| KR | 10-1703433 B1 | 2/2017 |
| KR | 10-2017-0079728 A | 7/2017 |
| KR | 10-1762655 B1 | 7/2017 |
| KR | 10-2019-0102689 A | 9/2019 |
| KR | 10-2020-0103196 A | 9/2020 |
| WO | WO 2021/006472 A1 | 1/2021 |

OTHER PUBLICATIONS

Korean Office Action issued on Jul. 3, 2023 in corresponding Korean Patent Application No. 10-2021-0099261. (4 pages in Korean).

Korean Office Action issued on Apr. 17, 2023 in corresponding Korean Patent Application No. 10-2021-0099261. (4 pages in Korean).

Anonymous, "Invivo6.0 Reference Manual", Anatomage, XP093264508, Retrieved from the URL: https://f.hubspotusercontent30. net/hubfs/19622231/Support%20Manuals/Invivo/Invivo%206.0/ Invivo%206.0%20User%20Manual%20ENG%20Rev%20G%20(UM-INV-ENG-60G), Aug. 11, 2020. (pp. 1-247).

Extended European Search Report issued on Apr. 10, 2025, in counterpart European Patent Application No. 22849848.1 (13pages in English).

Ghosn, Nabil, Joe Khoury, and Nada Naaman. "Computer-Assisted Analysis of Bone Volume for Sinus Augmentation Procedure", International Arab Journal of Dentistry, vol. 7, Issue 3, Jan. 1, 2016. (pp. 95-108).

* cited by examiner

| HU | BONE DENSITY LEVEL |
|---|---|
| >1250 | D1 |
| 80~1250 | D2 |
| 350~850 | D3 |
| 150~350 | D4 |
| <150 | D5 |

(a)

| HU | BONE QUALITY CLASSIFICATION |
|---|---|
| 150~350 | Soft Bone |
| 350~1250 | Normal Bone |
| >1250 | Hard Bone |

(b)

(a)    (b)    (c)

METHOD AND APPARATUS FOR DETERMINING AMOUNT OF BONE GRAFT, COMPUTER-READABLE RECORDING MEDIA, AND COMPUTER PROGRAM

CROSS REFERENCE TO RELATED APPLICATIONS

This application is a U.S. National Stage Application of International Application No. PCT/KR2022/010951, filed on Jul. 26, 2022, which claims the benefit under 35 USC 119(a) and 365(b) of Korean Patent Application No. 10-2021-0099261, filed on Jul. 28, 2021, in the Korean Intellectual Property Office, the entire disclosure of which is incorporated herein by reference for all purposes.

TECHNICAL FIELD

Embodiments relate to a method for determining an amount of bone graft, and more particularly, to a method and apparatus for determining an amount of bone graft that are for determining an amount of bone to be grafted onto a bone defect area.

BACKGROUND ART

Generally, in the process of designing a guide for implant surgery using software, a placement plan for an implant structure including a fixture is established, and implant surgery is performed according to the established placement plan.

The process of establishing the placement plan for the implant structure includes a task in which a practitioner places a virtual fixture at a position where the implant structure is attempted to be placed, and bone graft is necessary in some cases according to a state of an alveolar bone at the position where the virtual fixture is placed.

Generally, a bone at a site from where a tooth has been extracted is absorbed over a long period of time, and thus the overall thickness of an alveolar bone is decreased. Therefore, when a fixture is attempted to be placed in a posterior part from which a tooth has been extracted a long time ago, the thickness of an alveolar bone from a placement site to a maxillary sinus membrane is insufficient in many cases. In such cases, bone graft should be performed onto a portion of a maxillary sinus through maxillary sinus augmentation. Since techniques of maxillary sinus augmentation are actually standardized, an amount of bone to be grafted onto a maxillary sinus through maxillary sinus augmentation may be determined without difficulty, just using the thickness of an alveolar bone from a placement site to a maxillary sinus membrane.

DISCLOSURE

Technical Problem

Embodiments are directed to providing a method and apparatus for determining an amount of bone graft that are for effectively determining the type of bone defect using a bone density distribution around a position where a virtual fixture will be placed, in order to address a problem that a site of bone graft and an amount of bone graft at a mandibular or anterior part are not able to be accurately determined.

Embodiments are also directed to providing a method and apparatus for determining an amount of bone graft that are for measuring a site of bone graft and determining an amount of bone graft based on the type of bone defect.

Technical Solution

Embodiments provide a method for determining an amount of bone graft, the method including: placing a virtual fixture in a dental image; based on a bone density of an alveolar bone around the virtual fixture, detecting a boundary area of the alveolar bone; measuring a distribution of the bone density of the alveolar bone around the virtual fixture from at least one cross-sectional image of cross-sectional images in a plurality of directions and, based on the distribution of the bone density of the alveolar bone and the boundary area of the alveolar bone, determining a type of bone defect of the alveolar bone; and based on the type of bone defect, determining an amount of bone to be grafted onto a bone defect area.

The determining of the type of bone defect may further include generating a profile area that is a predetermined distance apart from an outer edge of the virtual fixture, and the distribution of the bone density of the alveolar bone around the virtual fixture may be a distribution of a bone density of the profile area.

The type of bone defect may include an internal bone defect, a horizontal bone defect, and a vertical bone defect.

The determining of the amount of bone to be grafted may include designating a bone graft determination range based on the virtual fixture and determining the amount of bone to be grafted within the bone graft determination range.

The bone graft determination range may be a first range apart from one side of the virtual fixture, a second range apart from the other side of the virtual fixture, a third range apart from a bottom of the virtual fixture, and a fourth range apart from a top of the virtual fixture.

In the determining of the amount of bone to be grafted, in a case in which the type of bone defect is the internal bone defect, a volume of a bone defect area may be measured by connecting at least two or more upper end areas of the alveolar bone, and the amount of bone to be grafted may be determined for a remaining area resulting from excluding a volume of the virtual fixture from the volume of the bone defect area.

In the determining of the amount of bone to be grafted, in a case in which the type of bone defect is the horizontal bone defect, and an upper surface of the bone graft determination range is at a lower position than an uppermost end of the alveolar bone, the fourth range of the bone graft determination range may be changed to a point of the uppermost end of the alveolar bone from the top of the virtual fixture, and the amount of bone to be grafted may be determined based on a volume of a remaining area resulting from excluding the volume of the virtual fixture from a volume that fills an inner area of the bone graft determination range that is changed according to the changed fourth range.

In the determining of the amount of bone to be grafted, in a case in which the type of bone defect is the vertical bone defect, the fourth range of the bone graft determination range may be changed to a line connecting the point of the uppermost end of the alveolar bone that is adjacent to the one side of the virtual fixture and the point of the uppermost end of the alveolar bone that is adjacent to the other side of the virtual fixture to each other, and the amount of bone to be grafted may be determined based on a volume of a remaining area resulting from excluding the volume of the virtual fixture from a volume that fills an inner area of the bone graft determination range that is changed according to the changed fourth range.

The method may further include, after the determining of the amount of bone to be grafted, determining a final amount of bone to be grafted onto the bone defect area based on an amount of bone to be grafted that corresponds to a predetermined proportion of the determined amount of bone to be grafted.

Embodiments provide a method for determining an amount of bone graft, the method including: collecting first image data displaying a current dental condition in which a tooth is lost and second image data displaying a condition before the tooth is lost; obtaining outer shape information of a virtual alveolar bone by registration of the first image data and the second image data; and determining the amount of bone graft based on the outer shape information of the virtual alveolar bone.

After the first image data is delivered as an input to a dental image recovery neural network, the second image data may be output from the dental image recovery neural network, and the dental image recovery neural network may be a neural network that learns in advance using a plurality of pieces of learning dental image data before a tooth is lost and a plurality of pieces of learning lost tooth image data after the tooth is lost, which are obtained from a plurality of patients, as label data and input data.

The second image data may be obtained by imaging before a patient, who is a subject of the first image data, loses a tooth.

In the determining of the amount of bone graft, the amount of bone graft may be determined based on a volume of an area resulting from excluding an area in which a virtual fixture is placed from an area resulting from excluding outer shape information of a current alveolar bone from the outer shape information of the virtual alveolar bone.

Also, embodiments provide an apparatus for determining an amount of bone graft, the apparatus including: a memory configured to store a simulation control program for determining the amount of bone graft; and a processor configured to run the simulation control program stored in the memory, wherein the processor places a virtual fixture in a dental image, based on a bone density of an alveolar bone around the virtual fixture, detects a boundary area of the alveolar bone, measures a distribution of the bone density of the alveolar bone around the virtual fixture from at least one cross-sectional image of cross-sectional images in a plurality of directions, based on the distribution of the bone density of the alveolar bone and the boundary area of the alveolar bone, determines a type of bone defect of the alveolar bone, and based on the type of bone defect, determines the amount of bone graft.

The processor may also generate a profile area that is a predetermined distance apart from an outer edge of the virtual fixture, and the distribution of the bone density of the alveolar bone around the virtual fixture may be a distribution of a bone density of the profile area.

The type of bone defect may include an internal bone defect, a horizontal bone defect, and a vertical bone defect.

The processor may designate a bone graft determination range based on the virtual fixture and may determine the amount of bone graft within the bone graft determination range.

The bone graft determination range may be a first range apart from one side of the virtual fixture, a second range apart from the other side of the virtual fixture, a third range apart from a bottom of the virtual fixture, and a fourth range apart from a top of the virtual fixture.

Also, embodiments provide a computer-readable recording medium storing a computer program, wherein the computer program includes instructions that, upon being executed by a processor, allow the processor to perform operations including: placing a virtual fixture in a dental image; based on a bone density of an alveolar bone around the virtual fixture, detecting a boundary area of the alveolar bone; measuring a distribution of the bone density of the alveolar bone around the virtual fixture from at least one cross-sectional image of cross-sectional images in a plurality of directions and, based on the distribution of the bone density of the alveolar bone and the boundary area of the alveolar bone, determining a type of bone defect of the alveolar bone; and based on the type of bone defect, determining an amount of bone to be grafted onto a bone defect area.

In addition, embodiments provide a computer program stored in a computer-readable recording medium, the computer program including instructions that, upon being executed by a processor, allow the processor to perform operations including: placing a virtual fixture in a dental image; based on a bone density of an alveolar bone around the virtual fixture, detecting a boundary area of the alveolar bone; measuring a distribution of the bone density of the alveolar bone around the virtual fixture from at least one cross-sectional image of cross-sectional images in a plurality of directions and, based on the distribution of the bone density of the alveolar bone and the boundary area of the alveolar bone, determining a type of bone defect of the alveolar bone; and based on the type of bone defect, determining an amount of bone to be grafted onto a bone defect area.

Advantageous Effects

According to embodiments, by determining the type of bone defect around a virtual fixture, a site of bone graft can be accurately measured.

Also, according to embodiments, by measuring an amount of bone graft based on the type of bone defect, the amount of bone that needs to be grafted onto a bone defect area can be accurately determined.

Also, according to embodiments, by measuring a boundary area of an alveolar bone and a distribution of a bone density of the alveolar bone, outer shape information of the alveolar bone can be obtained.

In addition, according to embodiments, by using computerized tomography (CT) data information before a tooth is lost and the current CT data information, outer shape information of an alveolar bone can be obtained.

DESCRIPTION OF DRAWINGS

FIGS. 2 and 3 are examples of a screen in which a virtual crown is placed in an image obtained by registration in the method according to embodiments.

5

Figure 6:
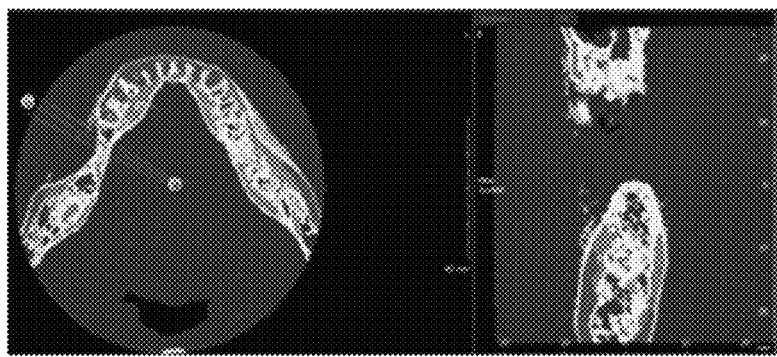

FIG. 6 is an example of a screen in which bone density values around a virtual fixture are shown using a color map according to embodiments.

FIGS. 7A and 7B are views showing examples of bone density levels relating to a range of Hounsfield Unit (HU) values according to embodiments.

Figure 8:
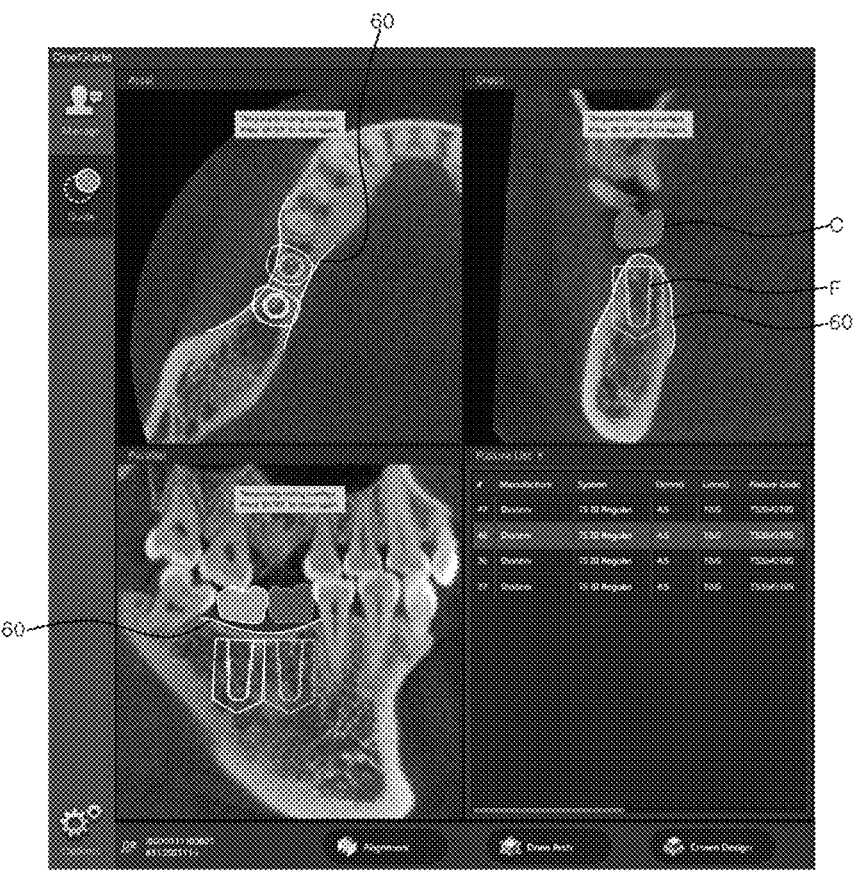

FIG. 8 is an example of a screen in which a boundary area of an alveolar bone is detected according to embodiments.

Figure 9:
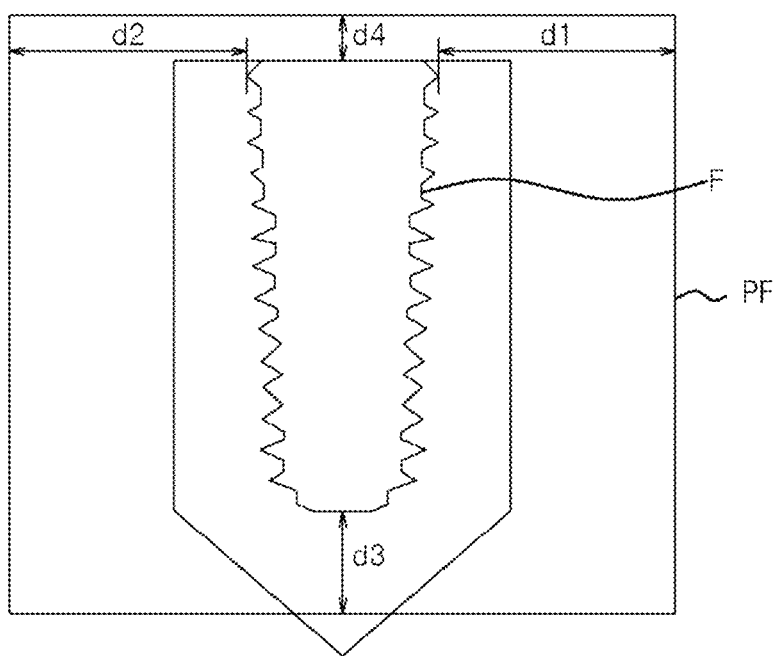

FIG. 9 is a view illustrating a range for measuring a bone density distribution using the method according to embodiments.

FIGS. 10 to 13 are views illustrating a state in which an alveolar bone area is detected using the range for measuring the bone density distribution.

Figure 14:
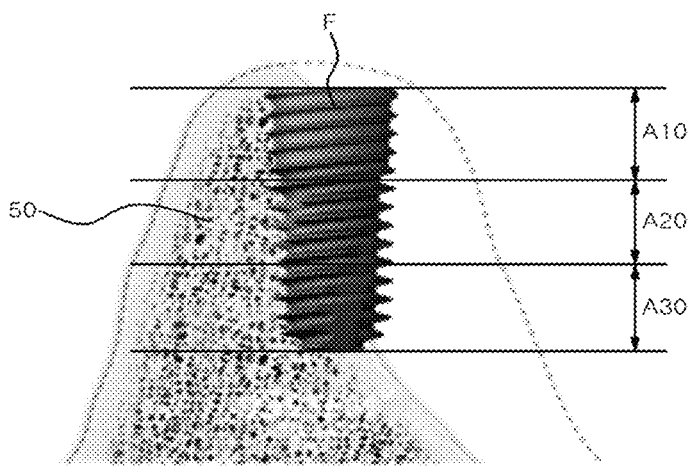

FIG. 14 is a view showing a state in which a virtual fixture is divided using the method according to embodiments.

Figure 15:
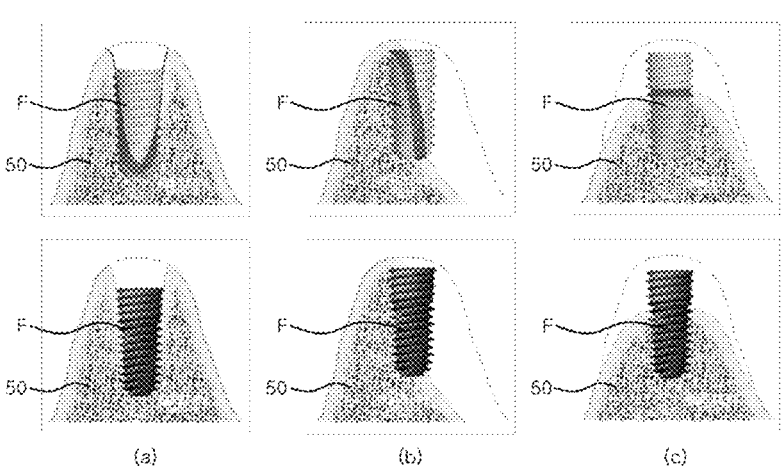

FIG. 15 is a view for describing types of bone defect of the method according to embodiments.

Figure 16:
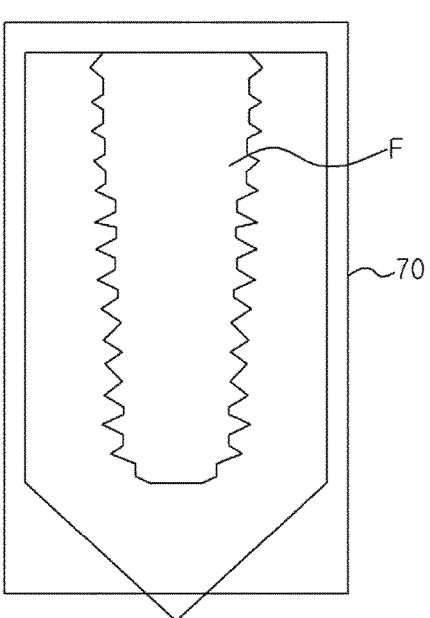

FIG. 16 is a view showing a bone graft determination range of the method according to embodiments.

Figure 17:
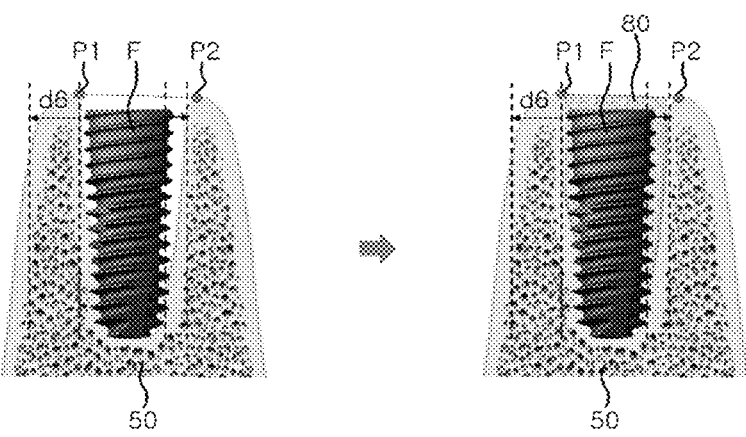
Figure 18:
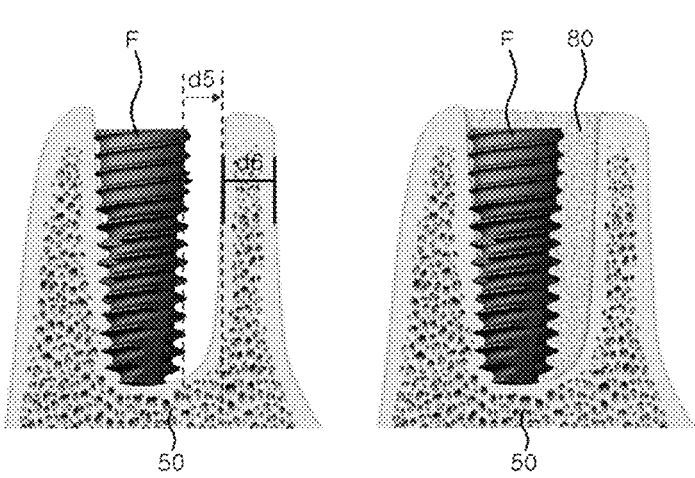

FIGS. 17 and 18 are views for describing processes of determining an amount of bone graft using the method according to embodiments when the type of bone defect is an internal bone defect inside a tooth extraction socket.

Figure 19:
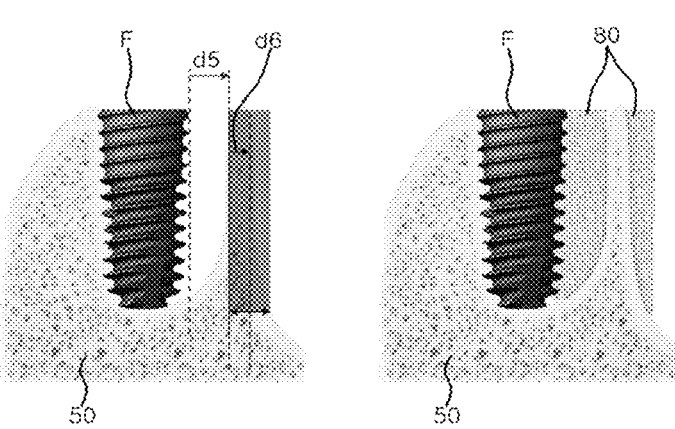
Figure 20:
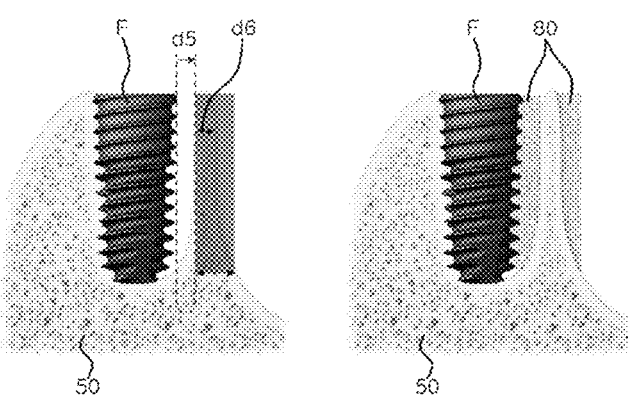

FIGS. 19 and 20 are views for describing other processes of determining an amount of bone graft using the method according to embodiments when the type of bone defect is an internal bone defect inside a tooth extraction socket.

Figure 21:
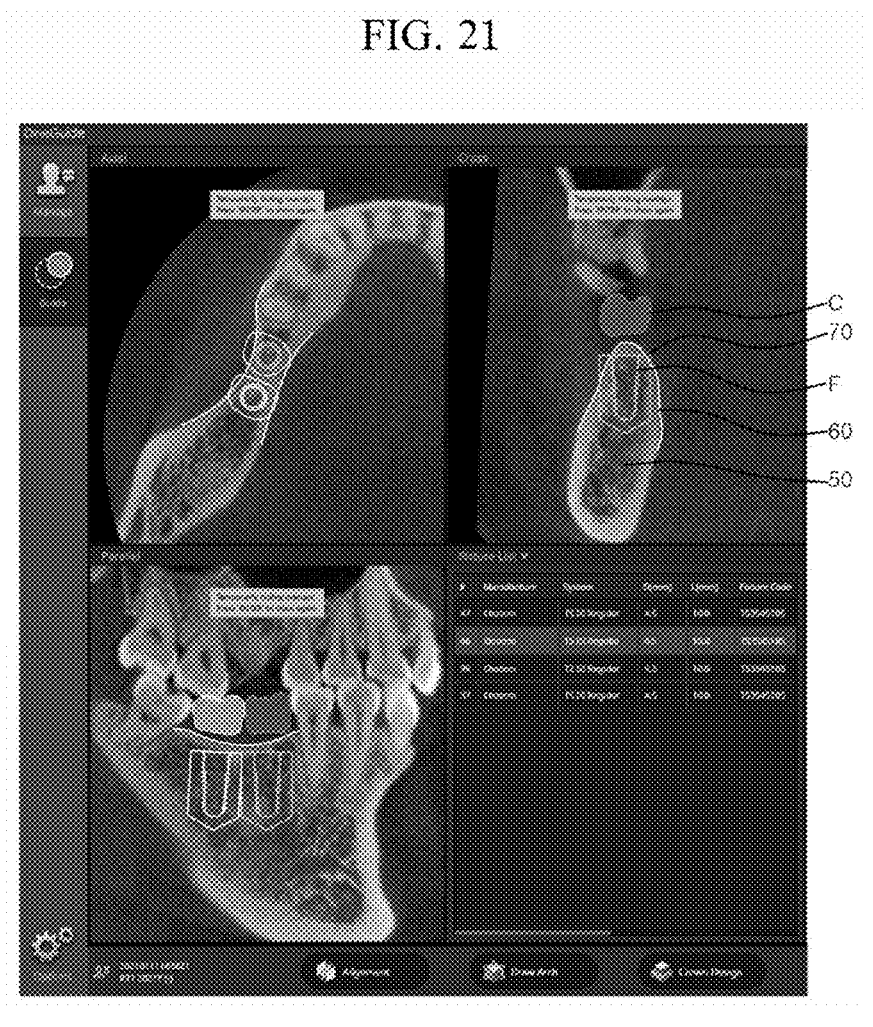
Figure 22:
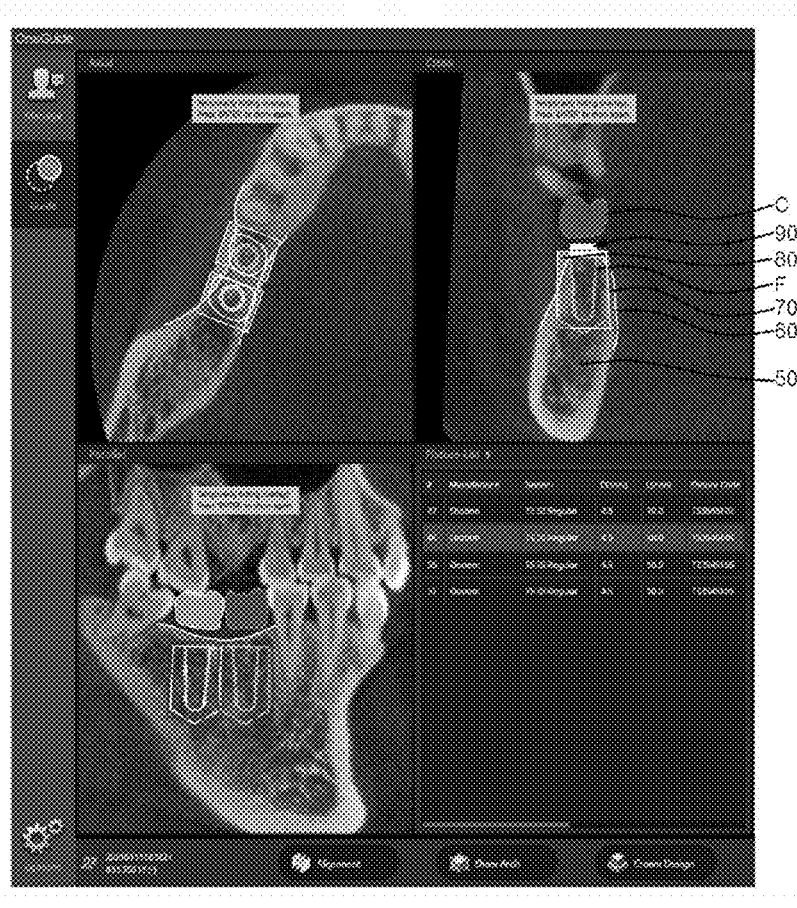

FIGS. 21 and 22 are simulation screens for describing a process of determining an amount of bone graft using the method according to embodiments when the type of bone defect is a horizontal bone defect.

Figure 23:
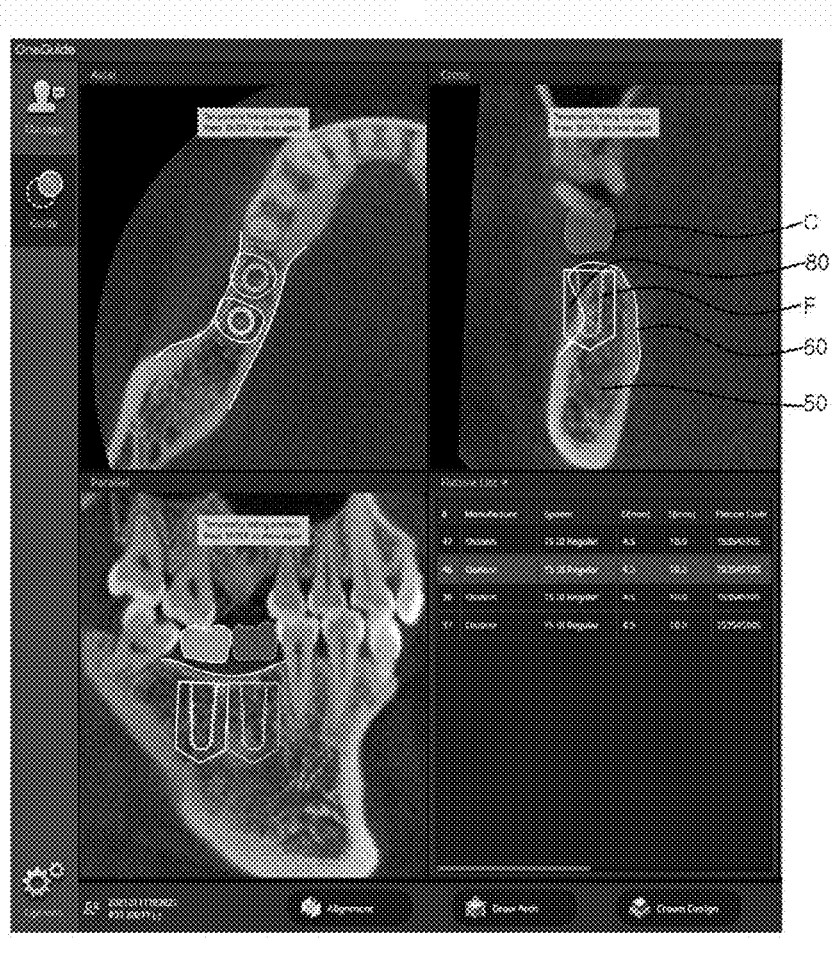
Figure 24:
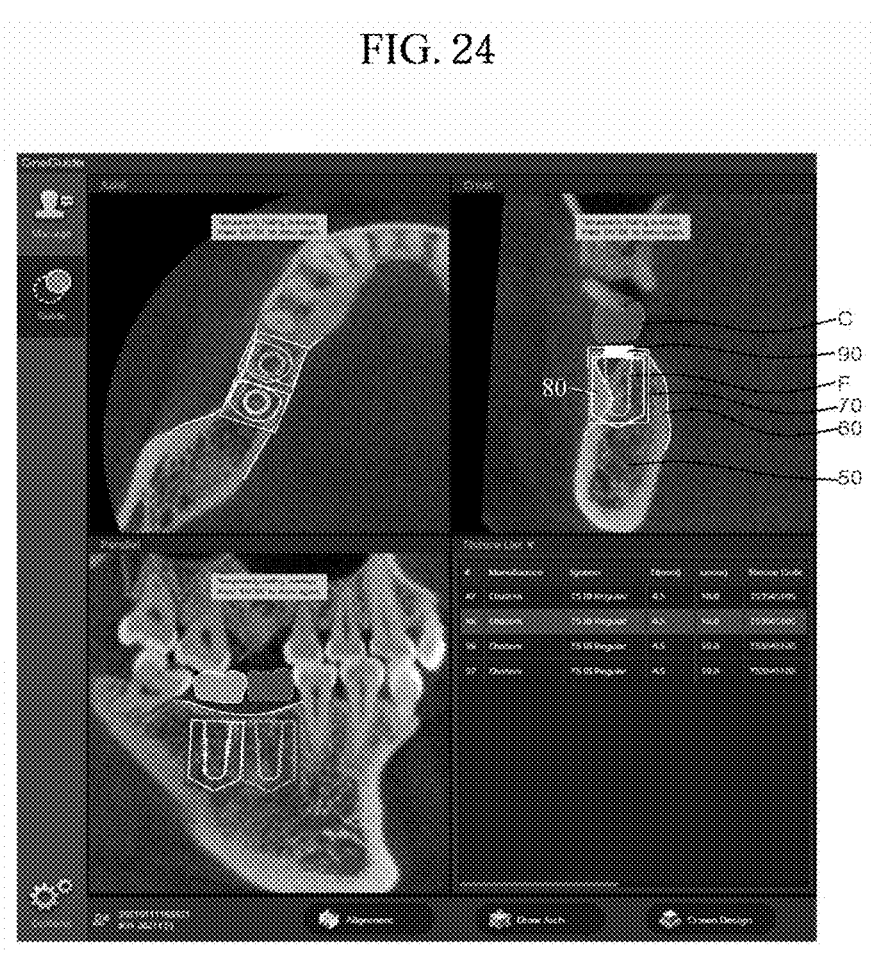

FIGS. 23 and 24 are simulation screens for describing another process of determining an amount of bone graft using the method according to embodiments when the type of bone defect is a horizontal bone defect.

Figure 25:
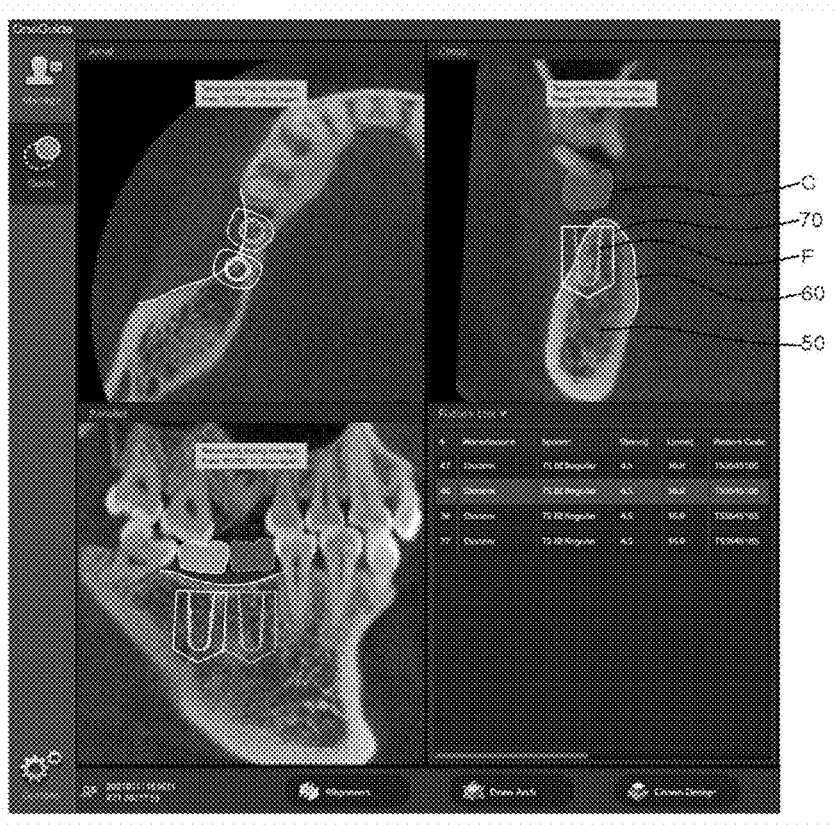
Figure 26:
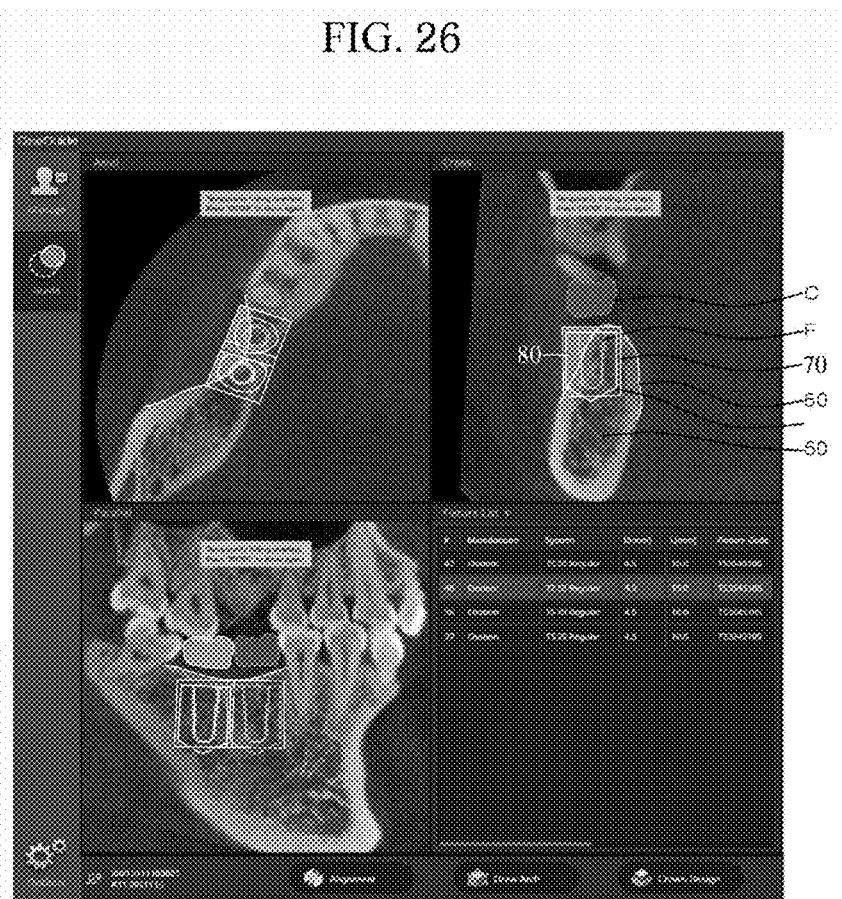
Figure 27:
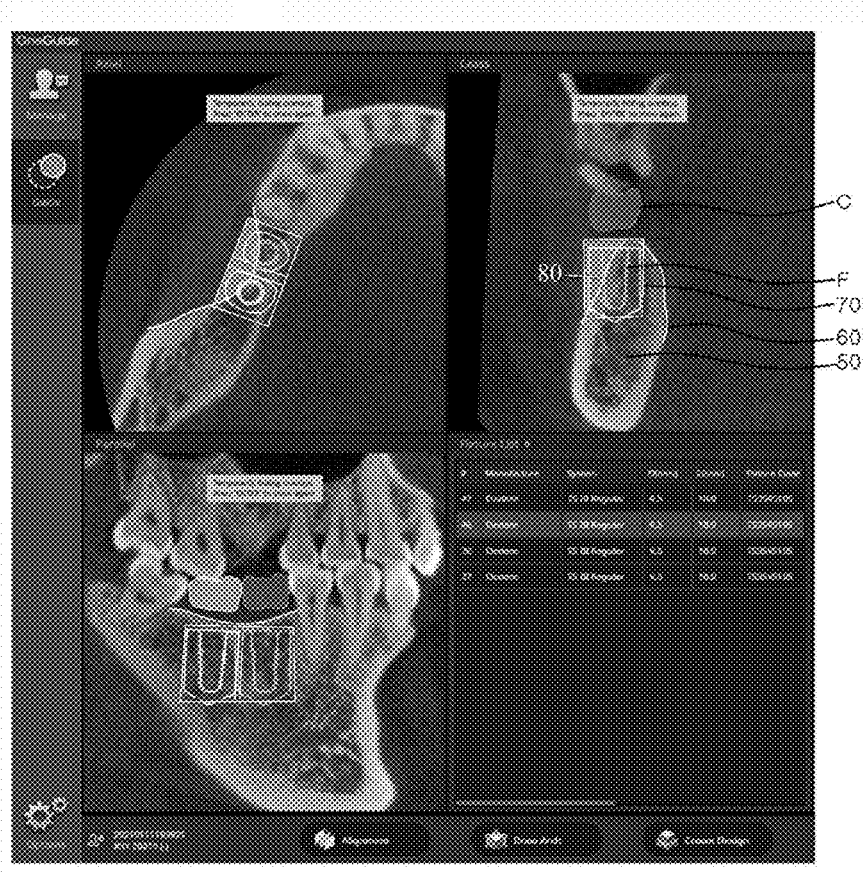

FIGS. 25 to 27 are simulation screens for describing still another process of determining an amount of bone graft using the method according to embodiments when the type of bone defect is a horizontal bone defect.

Figure 28:
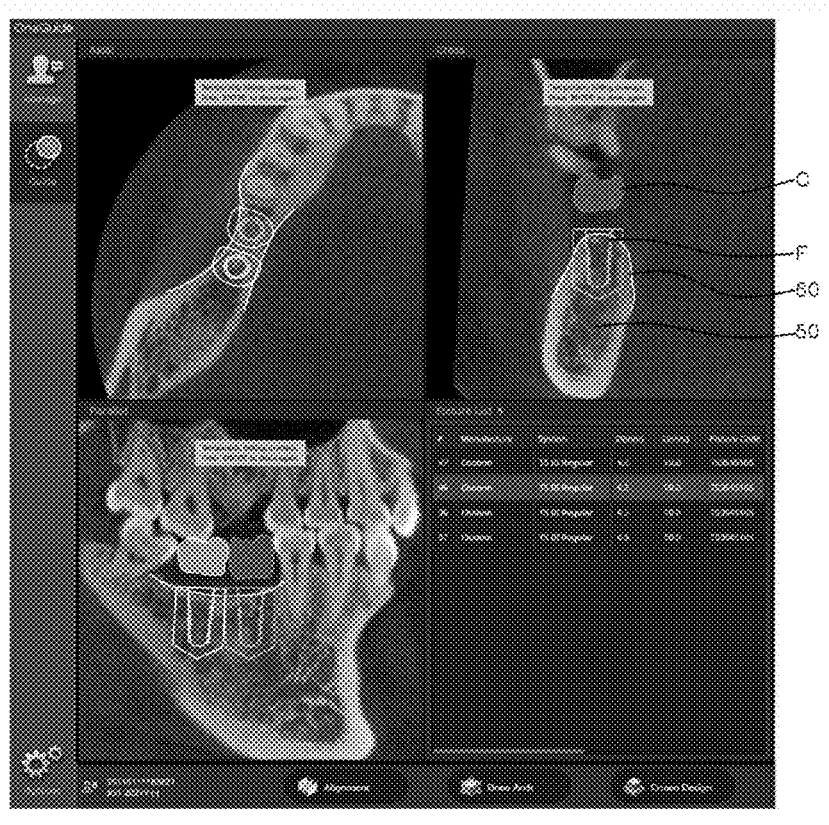
Figure 29:
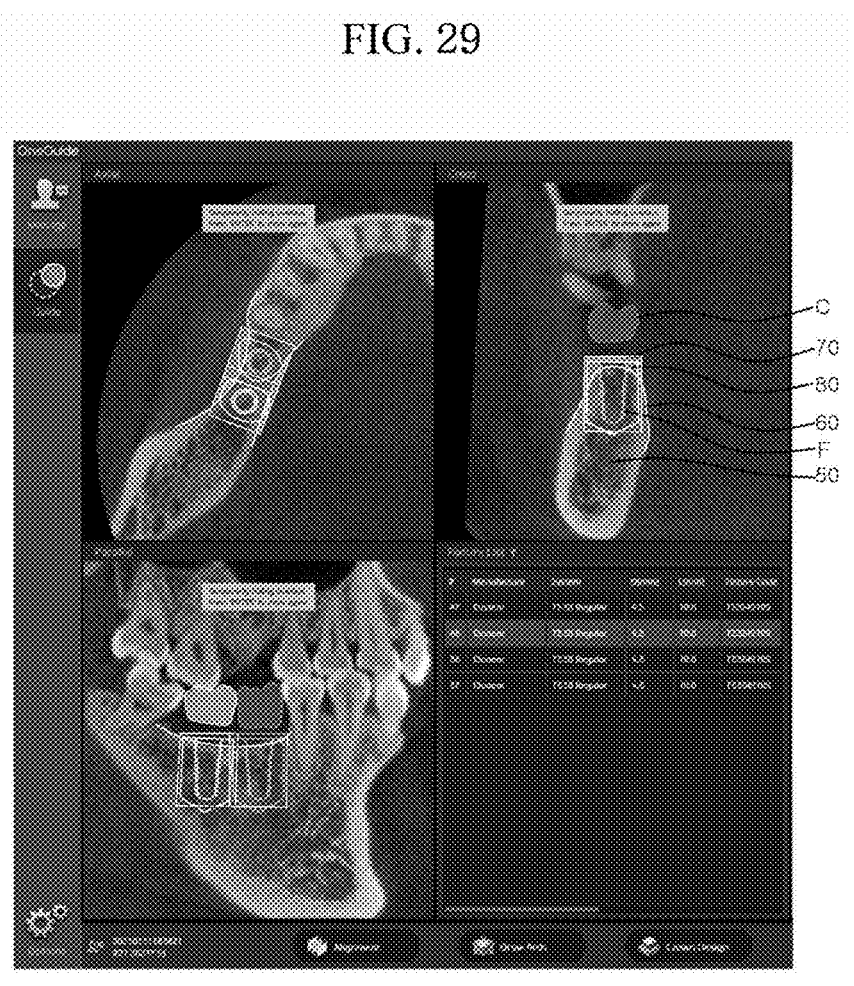
Figure 30:
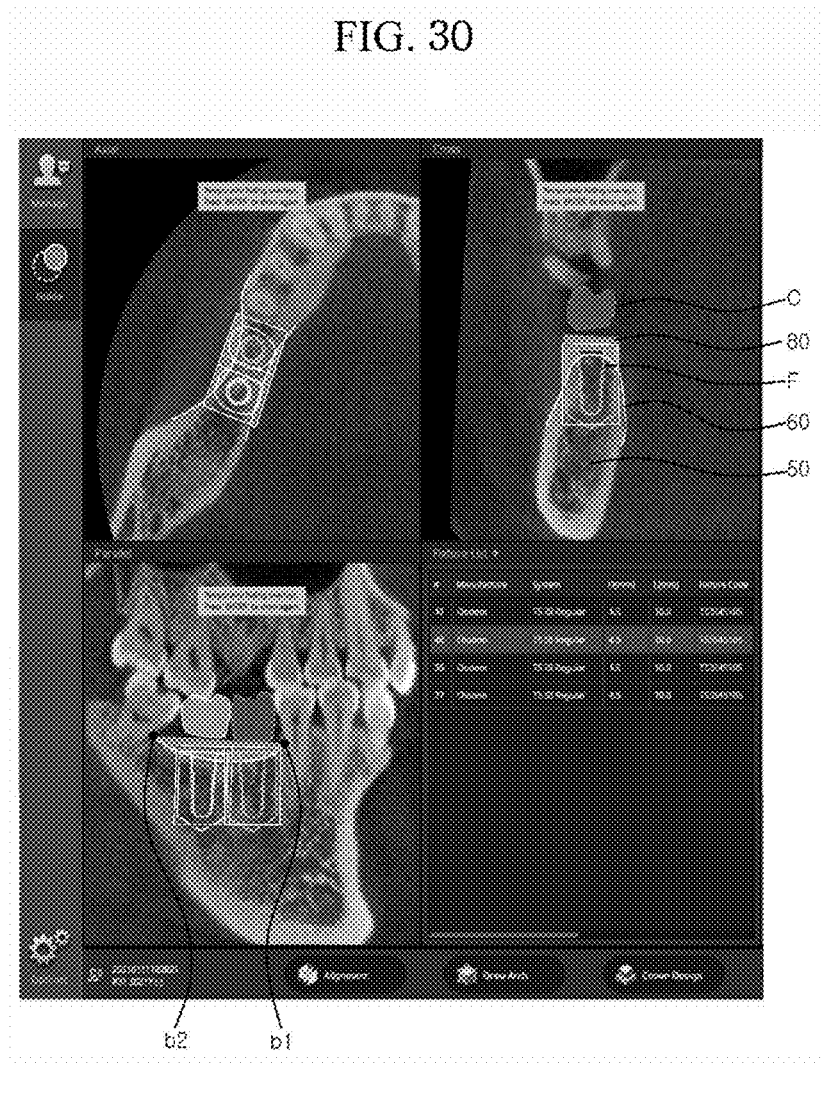

FIGS. 28 to 30 are views showing a state in which an amount of bone graft is determined using the method according to embodiments when the type of bone defect is a vertical bone defect.

Figure 31:
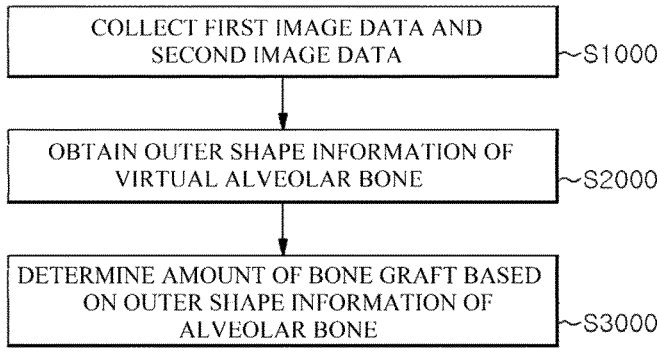

FIG. 31 is a flowchart showing a method for determining an amount of bone graft according to another embodiment.

Figure 32:
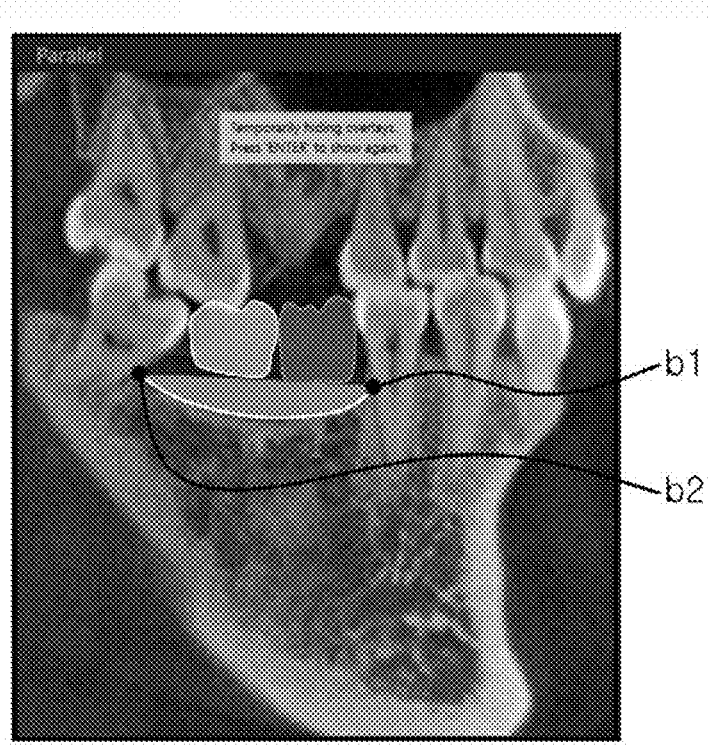
Figure 33:
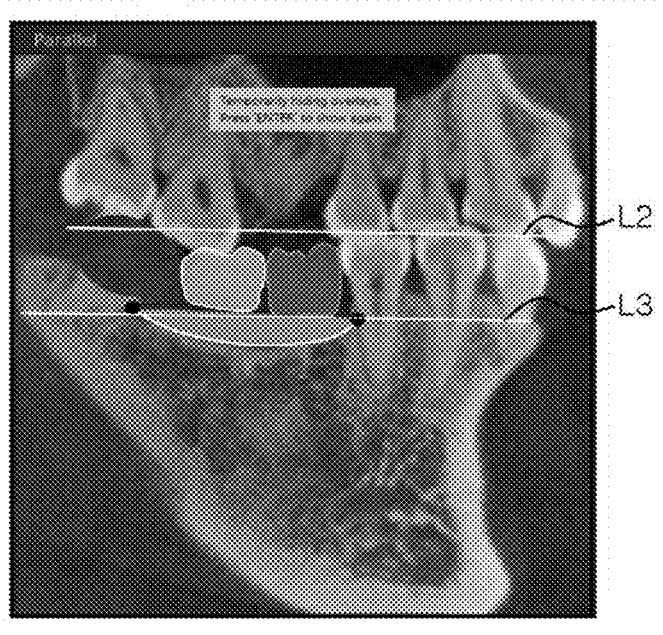
Figure 34:
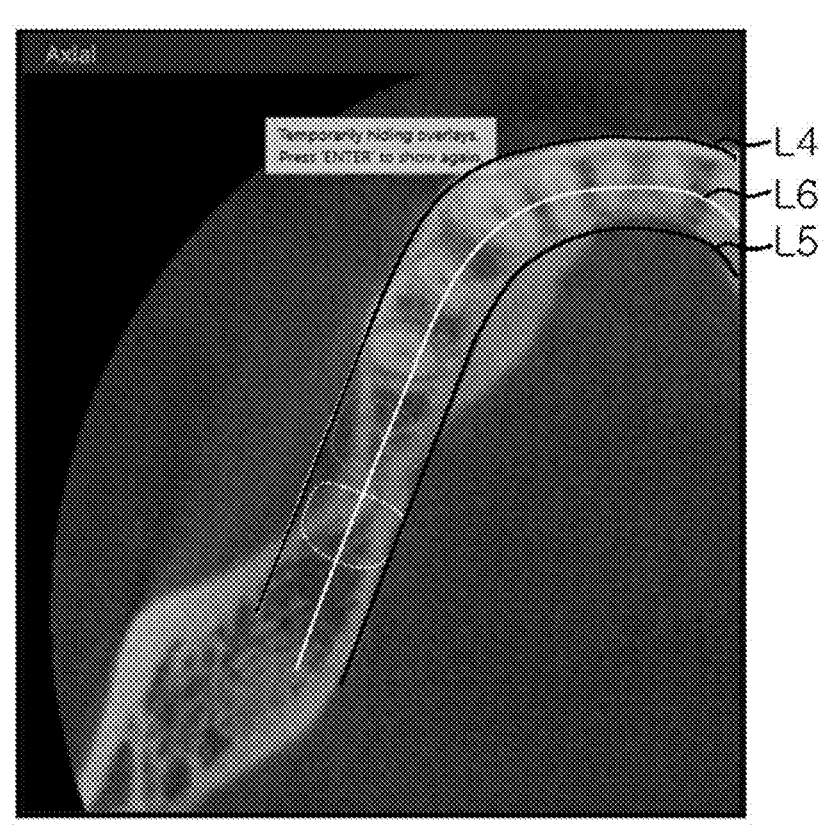

FIGS. 32 to 34 are simulation screens for describing a method of estimating outer shape information of an alveolar bone.

Figure 35:
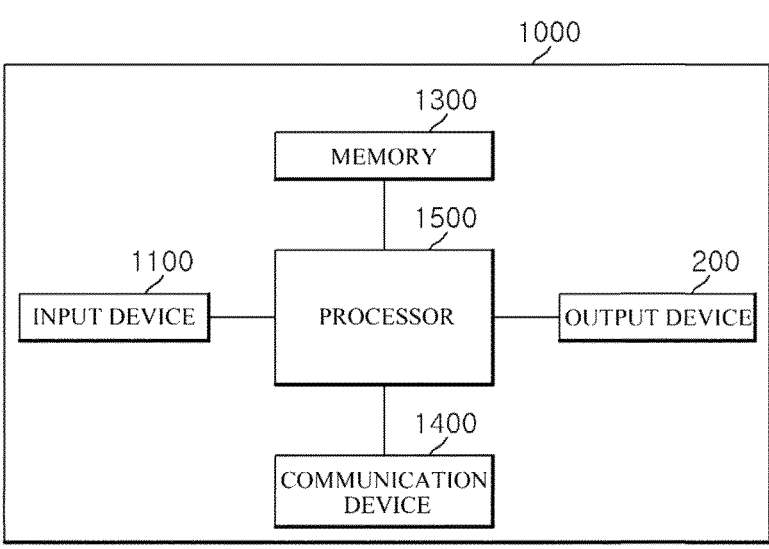

FIG. 35 is a view showing an apparatus for determining an amount of bone graft according to embodiments.

MODES OF THE INVENTION

Hereinafter, embodiments will be described in detail with reference to the accompanying drawings.

Figure 1:
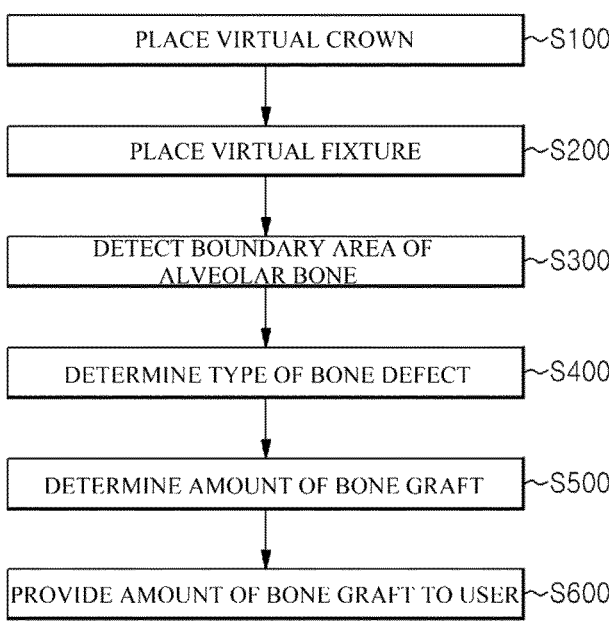
FIG. 1 illustrates a flowchart of a method for determining an amount of bone graft according to embodiments.

FIG. 1 illustrates a flowchart of a method for determining an amount of bone graft according to embodiments.

Referring to FIG. 1, the method for determining an amount of bone graft according to embodiments may include placing a virtual crown (S100), placing a virtual fixture (S200), detecting a boundary area of an alveolar bone (S300), determining a type of bone defect (S400), determining an amount of bone graft (S500), and providing the amount of bone graft to a user (S600).

6

Figure 2:
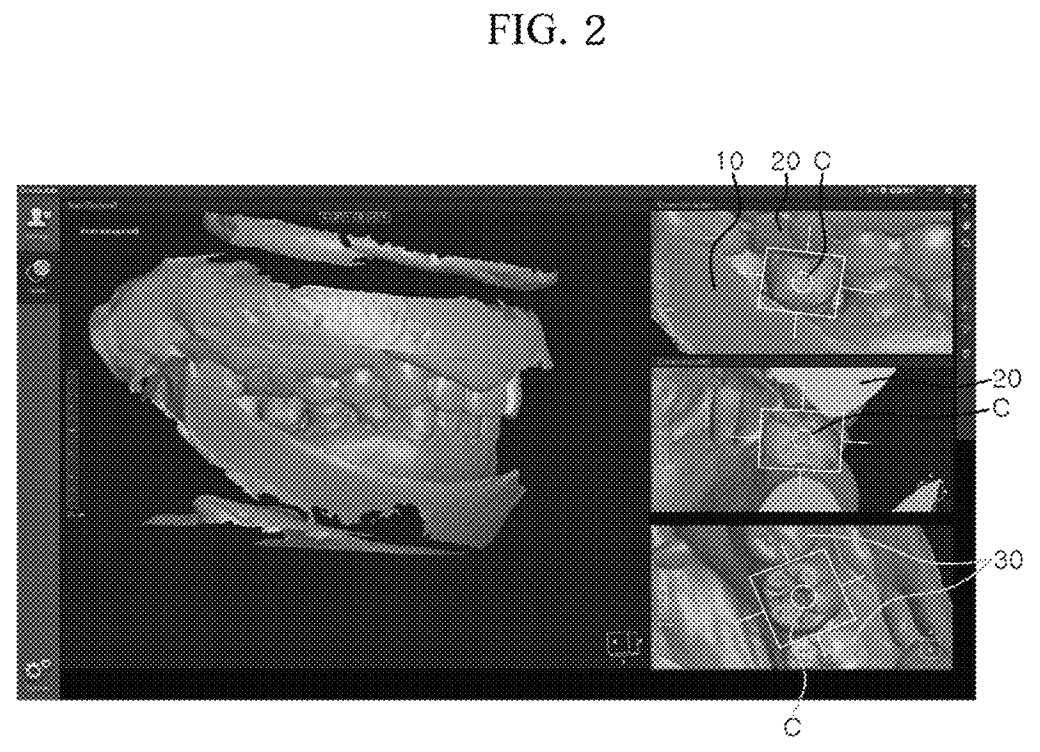
Figure 3:
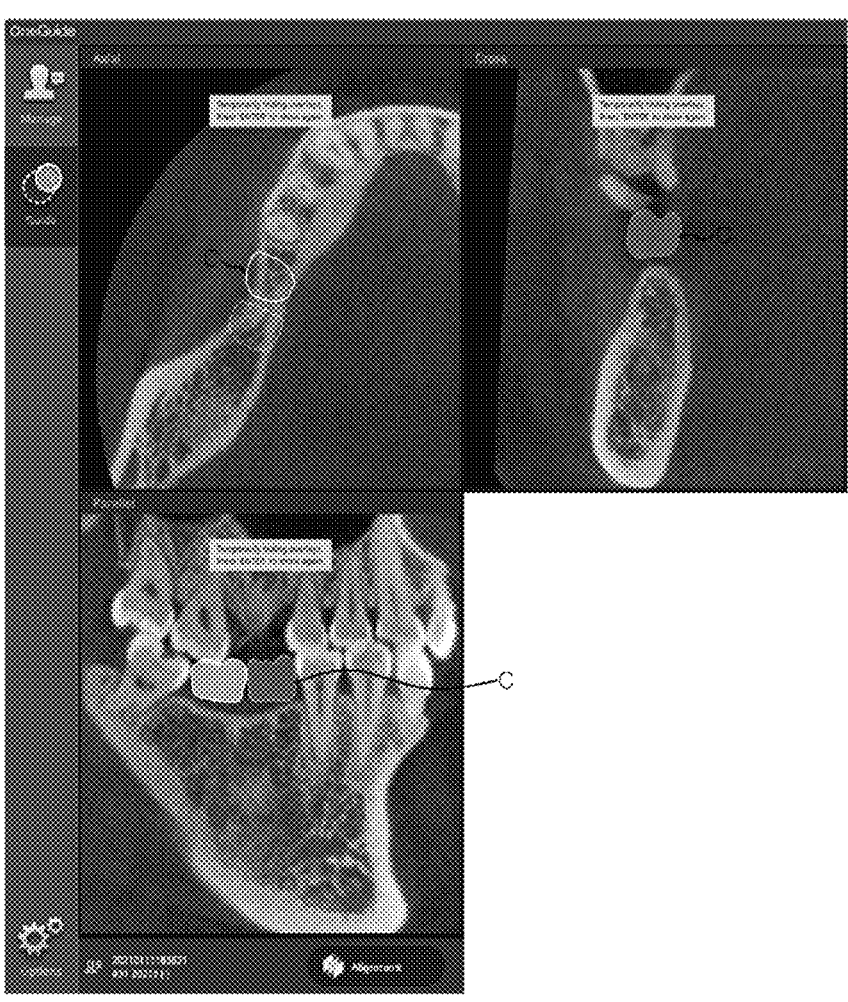

FIGS. 2 and 3 are examples of a screen in which a virtual crown is placed in an image obtained by registration in the method according to embodiments.

As illustrated in FIG. 2, in step S100, a virtual crown C may be placed in an image obtained by registration. The virtual crown C may be placed to correspond to an opposing tooth 20. Here, the image obtained by registration may be a first image obtained by registration of scan data and computerized tomography (CT) data. Step S100 may be performed in maxillary or mandibular scan data.

A length of the virtual crown C in a direction of an axial axis (AA) may be set from information on a distance between gums 10 and the opposing tooth 20. Buccal and lingual widths of the virtual crown C of the scan data may be determined from buccal and lingual widths of the opposing tooth 20. Mesial and distal widths of the virtual crown C may be determined based on adjacent teeth 30 at both sides that are adjacent to the virtual crown C.

When the length and widths of the virtual crown C are determined as above, based on information on the determined length and widths of the virtual crown C, as illustrated in FIG. 3, cross-sectional images in which the virtual crown C is placed, which are a cross-sectional image along a line perpendicular to the axis (Axial), a cross-sectional image along a line perpendicular to a direction from the mesial side to the distal side (Cross), and a cross-sectional image along a line perpendicular to a direction from the buccal side to the lingual side (Parallel), may be generated in the direction from the buccal side to the lingual side.

Referring back to FIG. 1, in step S200, the virtual fixture may be placed in an area corresponding to the virtual crown. The position of the virtual fixture may be determined automatically by software or manually by the user, and a state in which the virtual fixture is placed in the cross-sectional images may be displayed through a display device.

Figure 4:
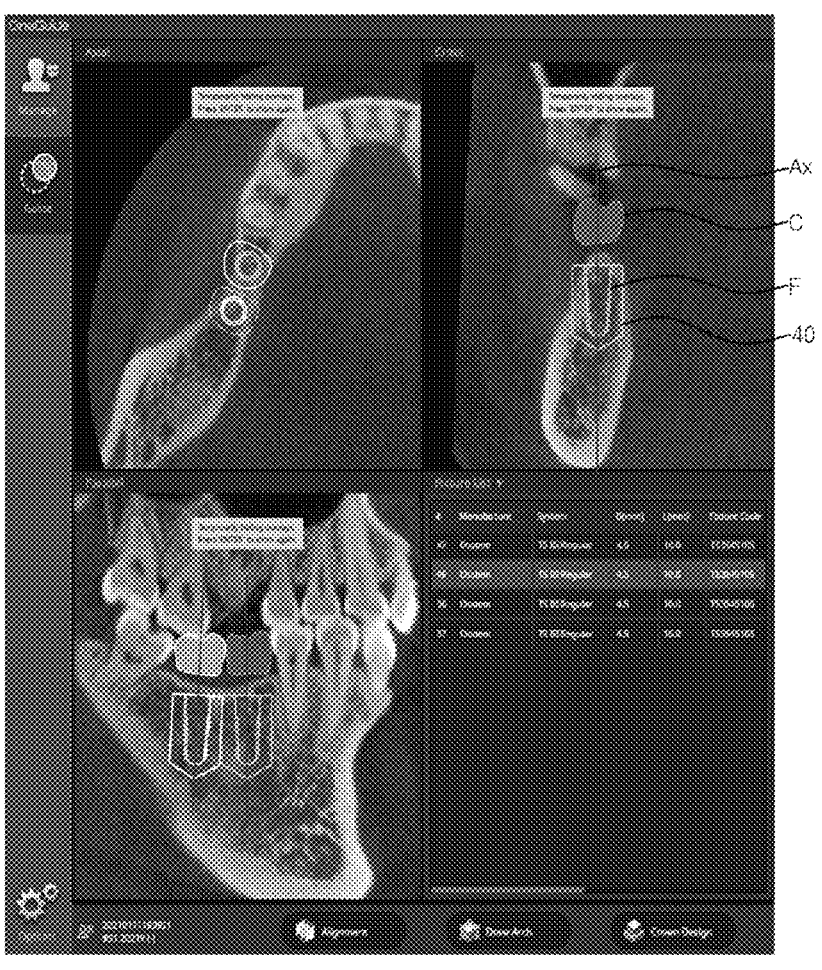
FIG. 4 is a view illustrating a screen in which a virtual fixture is placed in a cross-sectional image obtained by registration in the method according to embodiments.

FIG. 4 is a view illustrating a screen in which a virtual fixture is placed in a cross-sectional image obtained by registration in the method according to embodiments.

As illustrated in FIG. 4, a virtual fixture F may be placed on a tooth axis Ax of the virtual crown C. The virtual fixture F may be placed a first length, for example, 3 mm, below a gum line. Of course, the first length is not limited thereto. A fixture collision detection area 40 may be marked around the virtual fixture F.

Referring back to FIG. 1, in step S300, software may detect the boundary area of the alveolar bone from the cross-sectional image in which the virtual fixture is placed. Here, the software may detect the boundary area of the alveolar bone using Hounsfield Unit (HU, hereinafter referred to as "HU") values. The software may be stored in a computer-readable recording medium, which includes instructions to perform the method according to embodiments, and then loaded by a processor.

Figure 5:
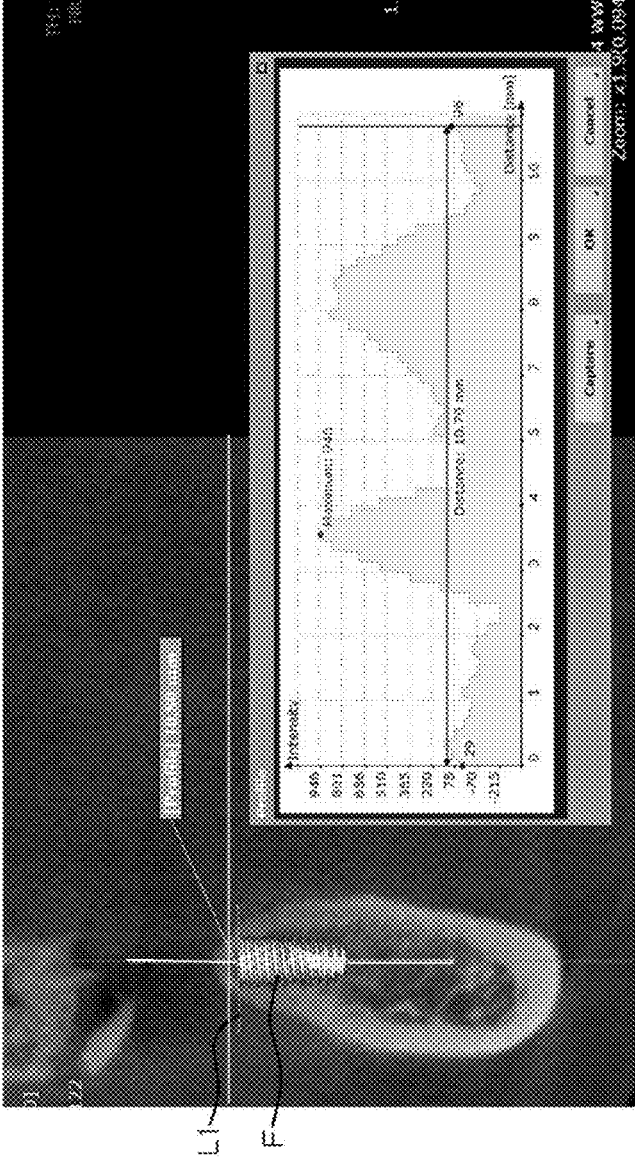
FIG. 5 illustrates a simulation screen for measuring a boundary area of an alveolar bone using the method according to embodiments.

FIG. 5 illustrates a simulation screen for measuring a boundary area of an alveolar bone using the method according to embodiments.

As illustrated in FIG. 5, the boundary area of the alveolar bone may be measured by software based on HU values that are measured based on one or more virtual horizontal lines L1. Since a HU value of a cortical bone forming the boundary of the alveolar bone is higher than HU values of other areas, excluding the boundary of the alveolar bone, when the HU values are measured along multiple virtual horizontal lines, the boundary area of the alveolar bone may be detected.

FIG. 6 is an example of a screen in which bone density values around a virtual fixture are shown using a color map according to embodiments.

As illustrated in FIG. 6, different areas of the alveolar bone may be shown with various colors. The colors may be determined according to bone density levels.

FIGS. 7A and 7B are views showing examples of bone density levels relating to a range of HU values according to embodiments.

As illustrated in FIG. 7A, bone density levels may be classified into five levels. D1 may be in a range of 1250 HU or higher, D2 may be in a range between 850 HU and 1250 HU, D3 may be in a range between 350 HU and 850 HU, D4 may be in a range between 150 HU to 350 HU, and D5 may be in a range of 150 HU or lower.

Unlike the above, as illustrated in FIG. 7B, bone density levels may be classified into three levels. "Soft Bone" may be in a range from 150 HU to 350 HU, "Normal Bone" may be in a range from 350 HU to 1250 HU, and "Hard Bone" may be in a range of 1250 HU or higher.

In an image, different colors may be shown according to the bone density levels such as D1 to D5 or "Soft Bone," "Normal Bone," and "Hard Bone." The user may infer a bone density level just by looking at the color.

The bone density levels described above have been classified into three levels or five levels, but standards for classifying the bone density levels are not limited thereto.

FIG. 8 is an example of a screen in which a boundary area of an alveolar bone is detected according to embodiments.

As illustrated in FIG. 8, software may display a boundary area 60 of the alveolar bone that is detected in step S300 with white lines in the cross-sectional images.

Referring back to FIG. 1, in step S400, the type of bone defect may be determined using information on the bone density distribution around the virtual fixture and the boundary area of the alveolar bone. The bone density distribution may be measured using a plurality of cross-sectional images.

For example, the bone density distribution around the virtual fixture may be measured using at least one cross-sectional image of the cross-sectional images in a plurality of directions. The cross-sectional images for measuring the bone density distribution around the virtual fixture may be cross-sectional images in the intersecting direction (Cross) and the parallel direction (Parallel) but are not limited thereto.

FIG. 9 is a view illustrating a range for measuring a bone density distribution using the method according to embodiments.

As illustrated in FIG. 9, a profile area PF that indicates a range for measuring the bone density distribution may be formed in the shape of a quadrangular box that is a predetermined distance apart from a surface of the virtual fixture F.

Specifically, the profile area PF may be a first distance d1 apart from one-side outer edge of the virtual fixture F and a second distance d2 apart from the other-side outer edge of the virtual fixture F. The profile area PF may be a third distance d3 below a lower end of the virtual fixture F. The profile area PF may be a fourth distance d4 above an upper end of the virtual fixture F.

The first distance d1, the second distance d2, the third distance d3, and the fourth distance d4 may each be several mm. For example, the first distance d1 and the second distance d2 may each be 5 mm. The third distance d3 may be 2 mm. The fourth distance d4 may be 1 mm. The values of the first distance d1, the second distance d2, the third distance d3, and the fourth distance d4 are not limited thereto.

FIGS. 10 to 13 are views illustrating a state in which an alveolar bone area is detected using the range for measuring the bone density distribution.

Figure 10:
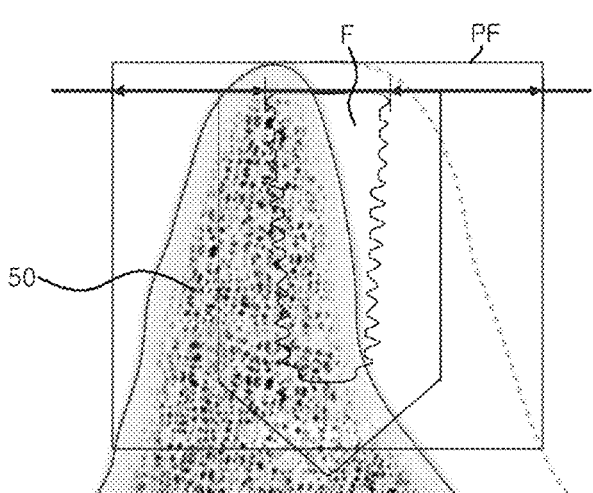
Figure 11:
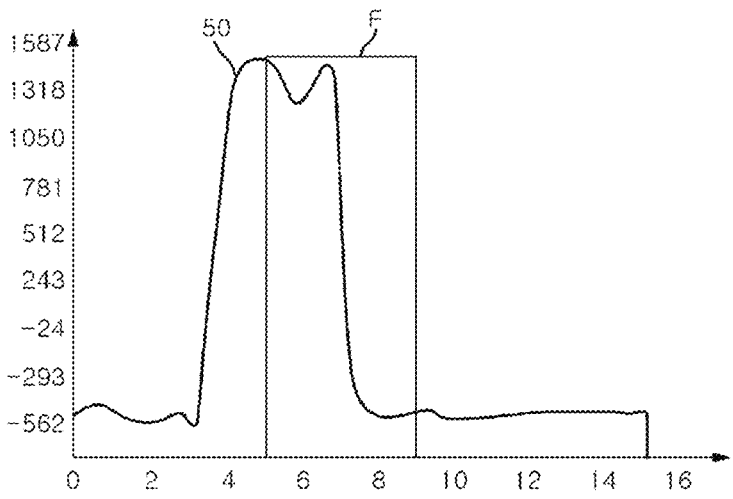

As illustrated in FIG. 10, a bone density distribution of an alveolar bone 50 around the virtual fixture F may be measured based on a virtual horizontal line within the range of the profile area PF, and coordinates of the alveolar bone 50 may be measured. As illustrated in FIG. 11, a position relationship between the alveolar bone 50 and the virtual fixture F may be checked using the measured coordinates of the alveolar bone 50 and position coordinates of the virtual fixture F. Here, it can be seen that a bone density value is measured to be high in a cortical bone area which is the boundary area of the alveolar bone, and a bone density value is measured to be low when the virtual fixture F and the alveolar bone are not in contact. Accordingly, whether the virtual fixture F and the alveolar bone 50 are in contact may be checked from the measured bone density values.

Figure 12:
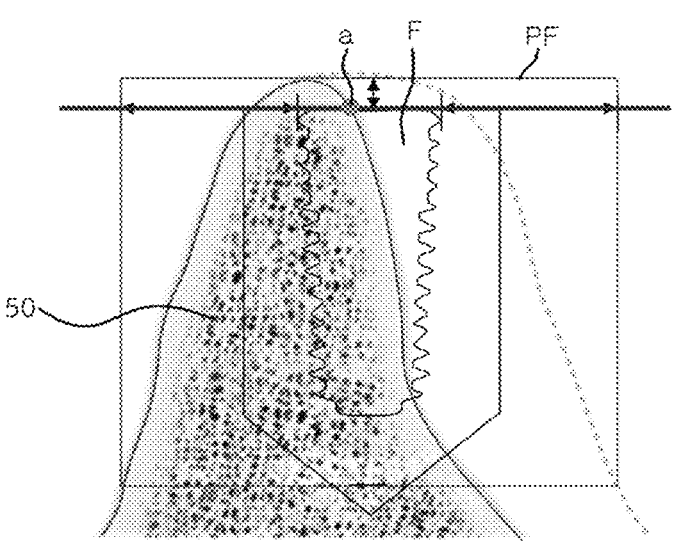
Figure 13:
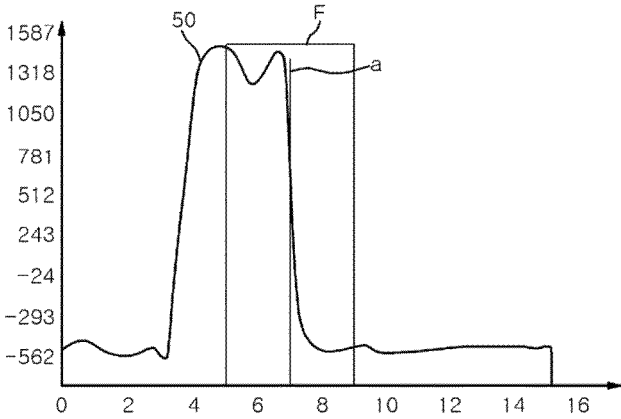

As illustrated in FIGS. 12 and 13, it can be seen that the virtual fixture F and the alveolar bone 50 are not in contact after point a, and thus the HU value sharply decreases after point a.

As another example, the bone density distribution may be measured as described below.

FIG. 14 is a view showing a state in which a virtual fixture is divided using the method according to embodiments.

As illustrated in FIG. 14, a cross-sectional image may be divided into a plurality of areas in the longitudinal direction of the virtual fixture F. For example, the cross-sectional image may be divided into a first area A10, a second area A20, and a third area A30.

Then, the bone density distribution of the first area A10, the second area A20, and the third area A30 may be measured. The overall bone density distribution may be measured using the measured bone density distribution of the first area A10, the second area A20, and the third area A30.

Referring back to FIG. 1, in step S400, the entire area of the alveolar bone may be detected using the previously-measured bone density distribution and the information on the boundary area of the alveolar bone, and the type of bone defect may be determined according to a position relationship between the virtual fixture and the shape of the detected alveolar bone area.

FIG. 15 is a view for describing types of bone defect of the method according to embodiments.

As illustrated in FIG. 15, a bone defect may be a structure in which the alveolar bone 50 surrounding the virtual fixture F is partially lost.

As illustrated in FIG. 15A, the type of bone defect may be an internal bone defect, for example, a bone defect in a tooth extraction socket that is formed after a tooth is extracted. As illustrated in FIG. 15B, the type of bone defect may be a horizontal bone defect in which bone of a horizontal area is lost. As illustrated in FIG. 15C, the type of bone defect may be a vertical bone defect.

Referring back to FIG. 1, in step S500, an amount of bone graft may be determined for a bone defect area. A method of determining the amount of bone graft may vary according to the type of bone defect. Step S500 may include designating a bone graft determination range and determining the amount of bone to be grafted within the bone graft determination range.

FIG. 16 is a view showing a bone graft determination range of the method according to embodiments.

As illustrated in FIG. 16, a bone graft determination range 70 may be schematically formed in the shape of a quadrangular box around the virtual fixture F. The bone graft determination range 70 may be a first range, for example, 2 mm, apart from one side of the virtual fixture F, a second range, for example, 2 mm, apart from the other side of the virtual fixture F, a third range, for example, 2 mm, apart from the bottom of the virtual fixture F, and a fourth range, for example, 1 mm, apart from the top of the virtual fixture F. The first to fourth ranges are not limited thereto.

When the type of bone defect is an internal bone defect, for example, a bone defect in a tooth extraction socket, the amount of bone graft may be determined as described below.

FIGS. 17 and 18 are views for describing processes of determining an amount of bone graft using the method according to embodiments when the type of bone defect is an internal bone defect inside a tooth extraction socket.

As illustrated in FIG. 17, the HU value may be increased again after being decreased when a separation distance from coordinates of the outermost edge of the virtual fixture F is less than 2 mm, upper end areas P1 and P2 of the alveolar bone 50 may be connected to measure a volume of an internal bone defect area when a bone width d6 of a remaining bone from the coordinates of the outermost edge of the virtual fixture F is 2 mm or more, and a bone graft amount 80 may be determined based on a remaining area resulting from excluding a volume of the virtual fixture F from the measured volume of the internal bone defect area.

As illustrated in FIG. 18, when the HU value is increased again after being decreased when a separation distance d5 from the coordinates of the outermost edge of the virtual fixture F is 2 mm or more, and the bone width d6 is 2 mm or more, as in the above-described method, upper end areas of the alveolar bone 50 may be connected to measure a volume of an internal bone defect area, and the bone graft amount 80 may be determined based on a remaining area resulting from excluding the volume of the virtual fixture F from the measured volume of the internal bone defect area.

FIGS. 19 and 20 are views for describing other processes of determining an amount of bone graft using the method according to embodiments when the type of bone defect is an internal bone defect inside a tooth extraction socket.

As illustrated in FIGS. 19 and 20, when the HU value is increased again after being decreased when the separation distance d5 from the coordinates of the outermost edge of the virtual fixture F is 2 mm or more or less than 2 mm, and the bone width d6 is less than 2 mm, as in the above-described method, upper end areas of the alveolar bone 50 may be connected to measure a volume of an internal bone defect area, and the bone graft amount 80 may be determined based on a remaining area resulting from excluding the volume of the virtual fixture F from the measured volume of the internal bone defect area.

Also, the bone graft amount 80 may be determined so that, for an area in which the bone width d6 is less than 2 mm, the bone width d6 of the alveolar bone 50 becomes 2 mm at the outer edge of the alveolar bone 50.

When the type of bone defect is a horizontal bone defect, the amount of bone graft may be determined as described below.

FIGS. 21 and 22 are simulation screens for describing a process of determining an amount of bone graft using the method according to embodiments when the type of bone defect is a horizontal bone defect.

When an upper end of the virtual fixture F is buried in the alveolar bone 50 but does not touch a reference line of the bone graft determination range 70 as illustrated in FIG. 21, an amount of bone graft that is filled inside the bone graft determination range 70 may be determined as illustrated in FIG. 22. Here, since an upper end portion 90 that corresponds to an upper surface of the virtual fixture F is an area that will be removed later by a drilling task, an amount of bone graft for the upper end portion 90 of the virtual fixture F may be excluded, and the bone graft amount 80 may be determined based on the remaining area excluding the volume of the virtual fixture F.

FIGS. 23 and 24 are simulation screens for describing another process of determining an amount of bone graft using the method according to embodiments when the type of bone defect is a horizontal bone defect.

When the alveolar bone 50 is lost at one side of the virtual fixture F, and the one side of the virtual fixture F does not touch a reference line of the bone graft determination range as illustrated in FIG. 23, the bone graft amount 80 that is filled inside the bone graft determination range 70 may be determined as illustrated in FIG. 24. Here, since the upper end portion 90 that corresponds to the upper surface of the virtual fixture F is an area that will be removed later by a drilling task, an amount of bone graft for the upper end portion 90 of the virtual fixture F may be excluded, and the bone graft amount 80 may be determined based on the remaining area excluding the volume of the virtual fixture F.

FIGS. 25 to 27 are simulation screens for describing still another process of determining an amount of bone graft using the method according to embodiments when the type of bone defect is a horizontal bone defect.

When the alveolar bone 50 is lost at one side of the virtual fixture F, and an upper surface of the bone graft determination range 70 is at a lower position than the uppermost end of the alveolar bone 50 as illustrated in FIG. 25, an amount of bone graft that is filled inside the bone graft determination range 70 may be determined for the one side of the virtual fixture F and the upper end portion of the virtual fixture F as illustrated in FIG. 26, the bone graft determination range 70 may be changed to a point of the uppermost end of the alveolar bone 50 from the upper end portion of the virtual fixture F to determine an amount of bone graft that is filled inside the changed bone graft determination range 70 as illustrated in FIG. 27, and the bone graft amount 80 may be determined for the remaining area excluding the volume of the virtual fixture F.

When the type of bone defect is a vertical bone defect, the amount of bone graft may be determined as described below.

FIGS. 28 to 30 are views showing a state in which an amount of bone graft is determined using the method according to embodiments when the type of bone defect is a vertical bone defect.

When the alveolar bone 50 is lost at a position that corresponds to the upper end portion of the virtual fixture F as illustrated in FIG. 28, an amount of bone graft that is filled inside the bone graft determination range 70 may be determined as illustrated in FIG. 29. Here, as illustrated in FIG. 30, a line connecting a point b1 of the uppermost end of the alveolar bone that is adjacent to the one side of the virtual fixture F and a point B2 of the uppermost end of the alveolar bone that is adjacent to the other side of the virtual fixture F to each other may be generated, and the bone graft determination range 70 may be adjusted along the generated line. An amount of bone graft that is filled in the finally-changed bone graft determination range may be determined, and the bone graft amount 80 may be determined based on the remaining area excluding the volume of the virtual fixture F.

Referring back to FIG. 1, in step S600, for the determined amount of bone graft, for example, an amount of bone graft of about 120% may be calculated and finally provided to the user. For example, since, in the process of healing after bone grafting, some of the bone is resorbed, it is effective for the final amount of bone graft to be greater than the determined amount of bone graft.

Meanwhile, outer shape information of the alveolar bone may be obtained through pre-collected data. For example, when pieces of CT data before a tooth is lost are present, outer shape information of a virtual alveolar bone may be obtained through registration with an image of the current dental condition of a patient. Here, outer shape information of the alveolar bone may be information including the boundary area of the alveolar bone and bone density information of the alveolar bone.

Using the information, outer shape information of a virtual alveolar bone may be provided to the user by a line.

Also, when images or 3D images in the axial direction, the intersecting direction, and the horizontal direction are overlapped, information on the current dental condition of a patient may be recognized. An amount of bone graft may be determined after excluding not only the volume of the virtual fixture but also the information on the current dental condition of the patient.

Unlike the above, when pre-collected data is not present, outer shape information of the alveolar bone may be measured from a 2D image as described below, and an amount of bone graft may be determined using the measured outer shape information of the alveolar bone.

FIG. 31 is a flowchart showing a method for determining an amount of bone graft according to another embodiment, and FIGS. 32 to 34 are simulation screens for describing a method of estimating outer shape information of an alveolar bone.

As illustrated in FIG. 31, the method for determining an amount of bone graft may include collecting first image data and second image data (S1000), obtaining outer shape information of a virtual alveolar bone using the collected first image data and second image data (S2000), and determining an amount of bone graft based on outer shape information of an alveolar bone (S3000).

In step S1000, the first image data may be a patient's dental image displaying the current dental condition in which a tooth is lost. The second image data may be the patient's dental image before the tooth is lost. The second image data may be a dental image obtained by imaging before the tooth is lost.

Unlike the above, in step S1000, the second image data may be data obtained from a dental image recovery neural network. The dental image recovery neural network may receive the first image data as an input and may output the second image data.

The dental image recovery neural network may be a neural network that learns in advance using a plurality of pieces of learning dental image data before a tooth is lost and a plurality of pieces of learning lost tooth image data after the tooth is lost, which are obtained from a plurality of patients, as label data and input data.

In step S2000, the outer shape information of the virtual alveolar bone may be obtained using an image resulting from registration of the first image data and the second image data.

As illustrated in FIG. 32, when adjacent teeth are present at both sides in a 2D cross-sectional image in the horizontal direction, uppermost end points b1 and b2 of the alveolar bone of the adjacent teeth may be connected by a straight line.

As illustrated in FIG. 33, when there is no tooth at a hindmost side, a line L3 parallel to an occlusion plane L2 may be generated based on points of uppermost ends of the alveolar bone of adjacent teeth to estimate outer shape information of a virtual alveolar bone.

Also, as illustrated in FIG. 34, in a 2D cross-sectional image in the axial direction, a buccal line L4 and a lingual line L5 may be formed to be parallel to a dental arch line L6 to estimate outer shape information of a virtual alveolar bone.

Referring back to FIG. 31, in step S3000, an amount of bone graft may be determined based on an area excluding outer shape information of the current alveolar bone from outer shape information of a virtual alveolar bone and an area excluding the area in which the virtual fixture is placed.

FIG. 35 is a view showing an apparatus for determining an amount of bone graft according to embodiments.

Referring to FIG. 35, a bone graft amount determining apparatus 1000 according to embodiments may include an input device 1100, an output device 1200, a memory 1300, a communication device 1400, and a processor 1500.

The input device 1100 may include one or more input interfaces for receiving information selected by a user. For example, when an input interface is a mouse, the input device 1100 may recognize information selected by the user when the user clicks with the mouse or designates a certain area by dragging the mouse.

Also, the input device 1100 may include a communicator for receiving multiple bone density display information and patient condition information wired or wirelessly, or a keyboard or a microphone for receiving patient condition information, a search word, or a sentence.

Also, the input device 1100 may receive an operation signal for entering an automatic bone graft amount determination mode or a manual bone graft amount determination mode.

The output device 1200 may display a program screen that includes pieces of information generated by the processor 1500.

The output device 1200 may output screens generated by the processor 1500 based on information input from the input device 1100. The output device 1200 may output images in which a site of bone graft and an amount of bone graft according to a bone defect are displayed.

The output device 1200 may include a touchpad configured to display a user interface for entering the automatic bone graft amount determination mode or the manual bone graft amount determination mode, and in this case, the touchpad may simultaneously serve as the input device 1100 and the output device 1200.

The output device 1200 may display a site of bone graft and an amount of bone graft in any one form of an axial view, a coronal plane view, and a sagittal plane view according to view mode selection made by the user. Further, as the user selects a multi-mode, the output device 1200 may display a site of bone graft and an amount of bone graft through a plurality of continuous cross-sectional images.

The memory 1300 may store various pieces of data for the overall operation, such as a multiple bone density display control program. Specifically, the memory 1300 may store a plurality of application programs run in the bone graft amount determining apparatus 1000 and data and instructions for operation of the bone graft amount determining apparatus 1000.

The memory 1300 may store dental image data of a patient. The dental image data may include X-ray data, CT data, or oral model data but is not limited thereto.

Through registration of data before a tooth is lost and an image of the current dental condition of the patient by using the dental image data of the patient that is stored in the memory 1300, a bone density display control program may obtain outer shape information of a virtual alveolar bone and may determine an amount of bone graft by utilizing the outer shape information of the virtual alveolar bone.

The memory 1300 may include magnetic storage media or flash storage media but is not limited thereto.

The communication device 1400 may be a device including hardware and software necessary for wired or wireless connection with another network device.

The communication device 1400 may transmit and receive data signals or control signals relating to a screen on which information on a site of bone graft and an amount of bone graft is displayed and pieces of information on the patient.

The communication device 1400 may perform communication using not only third generation (3G), long-term evolution (LTE), and fifth generation (5G), but also a low power wireless network (LPWN) and a low power wide area network (LPWAN) such as Narrowband Internet of Things (NB-IOT), long range (LoRa), SigFox, and LTE Category 1 (LTE-CAT1).

The communication device 1400 may perform communication using a communication method that uses a wireless local area network (LAN) such as WiFi 802.11a/b/g/n, as well as a wired LAN. In addition, the communication device 1400 may perform communication with an electric range or an external device using a communication method such as near-field communication (NFC) and Bluetooth.

Here, the communication device 1400 is not an essential component of the bone graft amount determining apparatus 1000 and may be mounted on the bone graft amount determining apparatus 1000 or, instead of being mounted thereon, provided in the form of an independent device separated therefrom as necessary.

The processor 1500 is a type of central processing unit (CPU) and may control the overall operation of the bone graft amount determining apparatus.

The processor 1500 may include any type of device that can process data. Here, for example, a "processor" may be a data processing device embedded in hardware that has a circuit physically structuralized to perform functions expressed as codes or commands included in a program. For example, the data processing device embedded in hardware may be a processing device such as a microprocessor, a CPU, a processor core, a multiprocessor, an application-specific integrated circuit (ASIC), or a field programmable gate array (FPGA) but is not limited thereto.

The operation of the processor 1500 will be described below.

The processor 1500 may run a control program for determining an amount of bone graft. The processor 1500 may perform control to perform the method according to the embodiments.

In other words, the processor 1500 may place a virtual crown in a dental image. The processor 1500 may perform control to place a virtual fixture at a position corresponding to the virtual crown and display a placement position of the virtual fixture.

The processor 1500 may perform control to detect a boundary area of an alveolar bone based on a bone density of an area around the virtual fixture.

The processor 1500 may perform control to measure a bone density distribution from cross-sectional images in a plurality of directions. The processor 1500 may perform control to form a profile area which is a range for measuring the bone density distribution and determine the type of bone defect based on the bone density distribution measured in the profile area.

The processor 1500 may perform control to determine an amount of bone to be grafted onto a bone defect area based on the type of bone defect.

Finally, the processor 1500 may control the output device 1200 and the communication device 1400 to provide the determined amount of bone graft to the user through an image.

Various embodiments of the present document may be implemented by software (e.g., a program) including instructions that is stored in machine (e.g., computer)-readable storage media (e.g., memory (internal memory or external memory)). A machine is an apparatus that can retrieve an instruction stored in storage media and operate according to the retrieved instruction and may include an electronic device according to disclosed embodiments. When the instruction is executed by a controller, the controller may perform a function corresponding to the instruction either directly or using other components under control of the controller. The instruction may include a code generated or executed by a compiler or an interpreter. The machine-readable storage media may be provided in the form of non-transitory storage media. Here, the non-transitory storage media only indicate not including media for transmitting signals and do not specify whether data is semi-permanently or temporarily stored in the storage media.

According to embodiments, the method according to various embodiments disclosed in the present document may be performed by a computer program recorded in machine-readable storage media.

According to one embodiment, a machine-readable storage medium (e.g., a computer-readable storage medium) storing a computer program may store a computer program including instructions that allow a processor to perform the method for determining an amount of bone graft according to one embodiment. Here, the method for determining an amount of bone graft may include: placing a virtual fixture in a dental image; based on a bone density of an alveolar bone around the virtual fixture, detecting a boundary area of the alveolar bone; measuring a distribution of the bone density of the alveolar bone around the virtual fixture from at least one cross-sectional image of cross-sectional images in a plurality of directions and, based on the distribution of the bone density of the alveolar bone and the boundary area of the alveolar bone, determining a type of bone defect of the alveolar bone; and based on the type of bone defect, determining an amount of bone to be grafted onto a bone defect area.

According to one embodiment, a computer program stored in a computer-readable recording medium may include instructions that allow a processor to perform the method for determining an amount of bone graft according to one embodiment. Here, the method for determining an amount of bone graft may include: placing a virtual fixture in a dental image; based on a bone density of an alveolar bone around the virtual fixture, detecting a boundary area of the alveolar bone; measuring a distribution of the bone density of the alveolar bone around the virtual fixture from at least one cross-sectional image of cross-sectional images in a plurality of directions and, based on the distribution of the bone density of the alveolar bone and the boundary area of the alveolar bone, determining a type of bone defect of the alveolar bone; and based on the type of bone defect, determining an amount of bone to be grafted onto a bone defect area.

Embodiments of the present disclosure have been described above with reference to the accompanying drawings, but those of ordinary skill in the art should understand that the embodiments may be modified and changed in various ways within the scope not departing from the technical spirit of the embodiments that is described in the claims below.

The invention claimed is:

1. A method for determining an amount of bone graft, the method comprising:

placing a virtual fixture in a dental image;

based on a bone density of an alveolar bone around the virtual fixture, detecting a boundary area of the alveolar bone;

measuring a distribution of the bone density of the alveolar bone around the virtual fixture from at least one cross-sectional image of cross-sectional images in a plurality of directions and, based on the distribution of the bone density of the alveolar bone and the boundary area of the alveolar bone, determining a type of bone defect of the alveolar bone; and based on the type of bone defect, determining an amount of bone to be grafted onto a bone defect area.

2. The method of claim 1, wherein the determining of the type of bone defect further includes generating a profile area that is a predetermined distance apart from an outer edge of the virtual fixture, and the distribution of the bone density of the alveolar bone around the virtual fixture is a distribution of a bone density of the profile area.

3. The method of claim 1, wherein the type of bone defect includes an internal bone defect, a horizontal bone defect, and a vertical bone defect.

4. The method of claim 1, wherein the determining of the amount of bone to be grafted includes designating a bone graft determination range based on the virtual fixture and determining the amount of bone to be grafted within the bone graft determination range.

5. The method of claim 4, wherein the bone graft determination range is a first range apart from one side of the virtual fixture, a second range apart from the other side of the virtual fixture, a third range apart from a bottom of the virtual fixture, and a fourth range apart from a top of the virtual fixture.

6. The method of claim 5, wherein, in the determining of the amount of bone to be grafted, in a case in which the type of bone defect is the internal bone defect, a volume of a bone defect area is measured by connecting at least two or more upper end areas of the alveolar bone, and the amount of bone to be grafted is determined for a remaining area resulting from excluding a volume of the virtual fixture from the volume of the bone defect area.

7. The method of claim 5, wherein, in the determining of the amount of bone to be grafted, in a case in which the type of bone defect is the horizontal bone defect, and an upper surface of the bone graft determination range is at a lower position than an uppermost end of the alveolar bone, the fourth range of the bone graft determination range is changed to a point of the uppermost end of the alveolar bone from the top of the virtual fixture, and the amount of bone to be grafted is determined based on a volume of a remaining area resulting from excluding the volume of the virtual fixture from a volume that fills an inner area of the bone graft determination range that is changed according to the changed fourth range.

8. The method of claim 5, wherein, in the determining of the amount of bone to be grafted, in a case in which the type of bone defect is the vertical bone defect, the fourth range of the bone graft determination range is changed to a line connecting the point of the uppermost end of the alveolar bone that is adjacent to the one side of the virtual fixture and the point of the uppermost end of the alveolar bone that is adjacent to the other side of the virtual fixture to each other, and the amount of bone to be grafted is determined based on a volume of a remaining area resulting from excluding the volume of the virtual fixture from a volume that fills an inner area of the bone graft determination range that is changed according to the changed fourth range.

9. The method of claim 1, further comprising, after the determining of the amount of bone to be grafted, determining a final amount of bone to be grafted onto the bone defect area based on an amount of bone to be grafted that corresponds to a predetermined proportion of the determined amount of bone to be grafted.

10. An apparatus for determining an amount of bone graft, the apparatus comprising:

a memory configured to store a simulation control program for determining the amount of bone graft; and a processor configured to run the simulation control program stored in the memory, wherein the processor places a virtual fixture in a dental image, based on a bone density of an alveolar bone around the virtual fixture, detects a boundary area of the alveolar bone, measures a distribution of the bone density of the alveolar bone around the virtual fixture from at least one cross-sectional image of cross-sectional images in a plurality of directions, based on the distribution of the bone density of the alveolar bone and the boundary area of the alveolar bone, determines a type of bone defect of the alveolar bone, and based on the type of bone defect, determines the amount of bone graft.

11. The apparatus of claim 10, wherein the processor also generates a profile area that is a predetermined distance apart from an outer edge of the virtual fixture, and the distribution of the bone density of the alveolar bone around the virtual fixture is a distribution of a bone density of the profile area.

12. The apparatus of claim 10, wherein the type of bone defect includes an internal bone defect, a horizontal bone defect, and a vertical bone defect.

13. The apparatus of claim 10, wherein the processor designates a bone graft determination range based on the virtual fixture and determines the amount of bone graft within the bone graft determination range.

14. The apparatus of claim 13, wherein the bone graft determination range is a first range apart from one side of the virtual fixture, a second range apart from the other side of the virtual fixture, a third range apart from a bottom of the virtual fixture, and a fourth range apart from a top of the virtual fixture.

* * * * *